United States Patent [19]

Nakazawa et al.

[11] Patent Number: 5,136,158
[45] Date of Patent: Aug. 4, 1992

[54] ANGULAR DISPLACEMENT DETECTING DEVICE FOR FLOATING BODY WITH INTEGRAL MAGNETIC PATH FORMING MEANS

[75] Inventors: Isao Nakazawa; Yasuhiko Shiomi, both of Kanagawa, Japan

[73] Assignee: Canon Kabushiki Kaisha, Tokyo, Japan

[21] Appl. No.: 619,904

[22] Filed: Nov. 28, 1990

[30] Foreign Application Priority Data

| Dec. 1, 1989 | [JP] | Japan | 1-310596 |
| Dec. 1, 1989 | [JP] | Japan | 1-310597 |
| Dec. 1, 1989 | [JP] | Japan | 1-310598 |
| Dec. 1, 1989 | [JP] | Japan | 1-310599 |
| Dec. 1, 1989 | [JP] | Japan | 1-310600 |
| Dec. 18, 1989 | [JP] | Japan | 1-327832 |

[51] Int. Cl.⁵ ............................................. G01D 5/30
[52] U.S. Cl. .................................. 250/230; 250/231.13
[58] Field of Search ................. 250/229, 230, 231.12, 250/231.13

[56] References Cited

U.S. PATENT DOCUMENTS 4,077,252 3/1978 Stutz et al. .................. 250/230
4,572,030 2/1986 Sakurai et al. ............... 250/229

Primary Examiner—David C. Nelms
Attorney, Agent, or Firm—Robin, Blecker Daley & Driscoll

[57] ABSTRACT

An angular displacement detecting device provided with a tubular casing having a chamber in which a liquid is sealed, a floating body disposed in the liquid and supported for rotation about a predetermined rotational axis, and a detector for detecting the relative angular displacement between the floating body and the tubular casing about the rotational axis, comprises a closed-magnetic-path forming member for forming a closed magnetic path including the floating body, an electrical conductor disposed in the closed magnetic path for relatively displacing the floating body with respect to the tubular casing by energization, and a controlling circuit for varying the amount of energization at the time of the energization of the electrical conductor.

48 Claims, 30 Drawing Sheets

| MEMORY ADDRESS | MEMORY DATA |
|---|---|
| 0 | M(0) |
| 1 | M(1) |
| ⋮ | ⋮ |
| X | M(X) |
| ⋮ | ⋮ |
| 2K-1 | M(2K-1) |

| MEMORY ADDRESS | MEMORY DATA |
|---|---|
| 0 | M(0) |
| 1 | M(1) |
| ⋮ | ⋮ |
| X | M(X) |
| ⋮ | ⋮ |
| 2K−1 | M(2K−1) |

$$a_0 \leftarrow \frac{\frac{2}{T}}{\frac{1}{CR} + \frac{2}{T}}$$

$$a_1 \leftarrow \frac{\frac{2}{T}}{\frac{1}{CR} + \frac{2}{T}}$$

$$b_1 \leftarrow \frac{\frac{1}{CR} - \frac{2}{T}}{\frac{1}{CR} + \frac{2}{T}}$$

700

$W_1 \leftarrow 0$

701

| MEMORY ADDRESS | MEMORY DATA |
|---|---|
| 0 | M(0) |
| 1 | M(1) |
| ⋮ | ⋮ |
| X | M(X) |

720

| MEMORY ADDRESS | MEMORY DATA |
|---|---|
| 0 | M(0) |
| 1 | M(1) |
| ⋮ | ⋮ |
| X | M(X) |
| ⋮ | ⋮ |
| 2K-1 | M(2K-1) |

ANGULAR DISPLACEMENT DETECTING DEVICE FOR FLOATING BODY WITH INTEGRAL MAGNETIC PATH FORMING MEANS

BACKGROUND OF THE INVENTION

1. Field of the Invention

The present invention relates to a device for detecting an angular displacement relative to absolute space by utilizing inertial force and, more specifically, to an angular displacement detecting device suitable for use in, for example, detecting an image shake which may occur during photography using a camera.

2. Description of the Related Art

A conventional angular displacement detecting device of this type is basically constructed as described below in detail, as disclosed in U.S. patent application Ser. No. 355,330, filed on May 23, 1989, and Japanese Laid open Patent Application Nos. Hei 2-82165 and Hei 2-02414. The construction will be explained with reference to FIGS. 37 to 39.

As shown in these figures, the conventional angular displacement detecting device comprises a base 401 to which individual parts for constituting the device are secured in position, and a tubular casing 402 serving as a sealed liquid container having a chamber in which a floating body 403 and a liquid 404 are sealed. The tubular casing 402 has a groove 402a which is formed in its inner wall so as to securely engage with a floating-body support 414 having a U-like cross section as shown in detail in FIG. 39. The floating body 403 has magnetic characteristics, and is supported for rotation about an axis 403a by the floating-body support 414. Mirrors 409 are respectively secured to one pair of opposed side faces of the central block of the floating body 403, and each of the mirrors 409 is covered by a mask 410 having a slit 410a. Arms 403b extend from the other pair of opposed side faces of the central block, respectively. The floating body 403 is constructed so as to maintain the balance of rotation about the axis 403a and the balance of buoyancy in the liquid 404. In addition, the floating body 403 has magnetic characteristics.

The liquid 404 which is sealed in the tubular casing 402 is a transparent liquid. A light emitting element (iRED) 405, which is adapted to emit light by energization, is secured to the base 401 via a light-emitting-element carrier 407. A light receiving element (PSD) 406 utilizes a photoelectric conversion device whose output varies with the position where light is received, and is fixed to the base 401 via a light-receiving-element carrier 408. The light emitting element 405 and the light receiving element 406 constitute optical angular displacement detecting means of the type which transmits light by means of either of the mirrors 409 secured to the opposed side faces of the central block of the floating body 403. A light guide portion 407a is formed on the light-emitting-element carrier 407 for guiding light emitted from the light emitting element 405, and a mask 410' is secured to the distal end of the light guide portion 407a. The mask 410' has a slit 410a' identical to the slit 410a of the mask 410. Since the light transmission is effected through the tubular casing 402, the whole of the tubular casing 402 or the part of the same upon which light falls is formed of a transparent material.

A pair of yokes 419 and 420 is disposed in such a manner as to produce a magnetic field action for holding the floating body 403 having the magnetic characteristics in a fixed position, i.e., in a position where the floating body 403 takes the shown attitude Ends 419a and 420a of the respective yokes 419 and 420 are opposed to and spaced apart from each other along the diameter of the tubular casing 402 as shown in FIG. 37. A yoke 421 is interposed between the other end portions of the yokes 419 and 420, and a solenoid coil 422 is fitted onto the yoke 421. The above-described arrangement allows a magnetic circuit to be formed by the yokes 419, 420 and 421 and the floating body 403, and a magnetic force is imparted to the floating body 403 by the magnetic force produced by the solenoid coil 422.

The above-described rotatable supporting of the floating body 403 is accomplished in the following manner. As shown in FIG. 38 in cross-sectional form, a rotary shaft 411 extends through the central block of the floating body 403 in the vertical direction, and a pivot 412 having an outwardly pointed end is press-fitted into each of the top and bottom ends of the rotary shaft 411. Pivot bearings 413 are respectively secured to the upper and lower arms of the U-like shape of the above-described floating body support 414 in such a manner that they are opposed to each other in the inward direction. The floating body 403 is supported by the engagement between the pointed ends of the pivots 412 and the corresponding pivot bearings 413.

A lid 415 is bonded to the tubular casing 402 in a sealed manner by a known art utilizing a silicone adhesive or the like. A packing rubber 416 is sandwiched between a pressure disk 417 and the lid 415, and is fixed by screws or the like.

In the above-described arrangement, the floating body 403 is constructed so that the balance of rotation about the axis 403a and the balance of buoyancy in the liquid 404 can be maintained as described previously in order to prevent an angular moment from occurring by the influence of gravitation whatever attitude the floating body 403 may take, and to prevent substantial loads from acting on the pivots or the pivot bearings.

According to the above-described arrangement, even if the tubular casing 402 rotates about the rotational axis 403a, an inner portion of the liquid 404 does not move owing to inertia and, therefore, the floating body 403 which is in a floating state does not rotate. As a consequence, the tubular casing 402 and the floating body 403 rotate about the rotational axis 403a with respect to each other. This is the principle of the device for detecting a relative angular displacement, and the relative angular displacement can be detected by the optical detecting means utilizing the light emitting element 405 and the light receiving element 406.

In practice, a flow is produced in the inner portion of the liquid 404 by the influence of the wall surface of the tubular casing 402, and the flow applies a viscosity force to the floating body 403. The influence of the flow, however, can be minimized by appropriately selecting factors such as the distance between the wall surface and the floating body 403 and the viscosity of the liquid 404.

In the device having the above-described arrangement, detection of an angular displacement is performed in the following manner.

Light emitted from the light emitting element 405 passes through the light guide 407a and illuminates the floating body 403, and light reflected by an illuminated one of the mirrors 409 reaches the light receiving element 406. As described above, the mask 410' is secured to the distal end of the light guide 407a, while the mask 410 is secured to each of the mirrors 409 of the floating body 403. Accordingly, the light is approximately collimated by the slit 410a of the mask 410 during light transmission, whereby a sharply focused image (slit image) is formed on the light receiving element 406.

The tubular casing 402, the light emitting element 405 and the light receiving element 406 integrally move since all of them are secured to the base 401. If a relative angular displacement occurs between the tubular casing 402 and the floating body 403, the slit image on the light receiving element 406 will move by an amount corresponding to the relative angular displacement. Accordingly, the light receiving element 406, which utilizes a photoelectric conversion device whose output varies with the position where light is received, produces an output substantially proportional to the positional displacement of the slit image. It is, therefore, possible to detect the angular displacement of the tubular casing 402 by utilizing such an output as information.

In the case of the angular displacement detecting device having the above-described arrangement, since no external force is applied to the floating body 403, the attitude of the floating body 403 cannot be restricted. As a result, it might be considered impossible to ensure that the slit image is positioned within the measurement range of the light receiving element 406. However, if, for example, the above-described solenoid coil 422 is used to exert a weak magnetic field action on the floating body 403, the magnetic field action can be made to act as a spring force which produces a force locating the floating body 403 at the steady position shown in FIG. 37.

The spring force exerted on the floating body 403 by the magnetic field action is theoretically a force which maintains the floating body 403 in a fixed attitude with respect to the tubular casing 402, i.e., a force which acts to move the floating body 403 integrally with the tubular casing 402. If such spring force is excessively strong, the tubular casing 402 and the floating body 403 will move integrally, thus resulting in the problem that a relative angular displacement required for a desired angular displacement is not produced. However, if the magnetic field action is made sufficiently small with respect to the inertia of the liquid 404, it is possible to realize an arrangement capable of responding to an angular displacement of relatively low frequency as well.

In the above-described arrangement, the floating body 403 is subject to a force acting to move it in the direction in which the magnetic resistance of the magnetic field produced by the coil 422 is reduced. In other words, the floating body 403 tends to move so as to reduce such magnetic resistance in a closed magnetic path formed among the floating body 403, the yoke 419, the yoke 421, the yoke 420 and the floating body 403. More specifically, when the end 419a of the yoke 419, the longitudinal axis of the floating body 403 and the end 420a of the yoke 420 are aligned as shown in FIG. 37, the magnetic resistance reaches its minimum. Accordingly, if a displacement occurs in this state, a force acts to return the floating body 403 to its original position.

Although several modifications are proposed in the above noted patent applications, each is basically identical to the above-described arrangement in that a magnetic force acts as a spring force in the fixed direction determined by the arrangement of yokes which form part of a closed magnetic path.

The liquid 404 sealed in the tubular casing 402 is required to have light transmission properties, low viscosity and high specific gravity. The light transmission properties are indispensable for realizing position detection utilizing light emitting and receiving elements. The viscosity of the liquid 404 tends to cooperate with the wall surface of the tubular casing 402 to integrally move the tubular casing 402 and the floating body 403, resulting in accuracy deterioration. However, if the viscosity of the liquid 404 is small, the resultant force will be small and accuracy will be improved. Further, if the viscosity is small, the gap between the wall surface of the tubular casing 402 and the floating body 403 can be made small, whereby the arrangement can be made compact. The above explanation also applies to the high specific gravity. Since the detecting device utilizes inertia, it is a matter of course that as the inertia increases, the accuracy improves. The high specific gravity also contributes toward realizing a compact arrangement.

As is apparent from the foregoing, limitations imposed on the liquid 404 are strict and the performance and size of the device are greatly influenced by the liquid 404. These disadvantages lead to the problem that it is extremely difficult to improve or maintain the start-up characteristics and frequency characteristics of the device as well as the stability thereof with respect to environments.

In addition, the floating body 403, which is in a stationary state, and the yokes 419 and 420 are not aligned by the influence of gravitation due to the mechanical unbalance of the floating body 403. If the mechanical unbalance excessively increases, the light from the light emitting element 405 is shifted from the optical axis of the light receiving element 406. In this case, there is no choice but to mechanically shift the position of the yokes 419 and 420 or that of the light receiving element 406, with the result that the complexity of an associated adjustment mechanism increases.

SUMMARY OF THE INVENTION

It is, therefore, an object of the present invention to solve the above-described problems.

Another object of the present invention is to provide an angular displacement detecting device in which it is possible to improve and maintain start-up characteristics and frequency characteristics as well as stability with respect to environments.

To achieve the above-described objects, one preferred form of the present invention pertains to an angular displacement detecting device which is provided with a tubular casing having a chamber in which a liquid is sealed, a floating body disposed in the liquid and supported for rotation about a predetermined rotational axis, and detecting means for detecting the relative angular displacement between the floating body and the tubular casing about the rotational axis. The angular displacement detecting device includes closed-magnetic-path forming means for forming a closed magnetic path including the floating body, an electrical conductor disposed in the closed magnetic path for relatively displacing the floating body with respect to the tubular casing by energization, and a controlling circuit for varying the amount of energization at the time of the energization of the electrical conductor. In the above-described arrangement, it is possible to freely vary the characteristics by varying the amount of energization of the electrical conductor and, further, it is possible to electrically adjust the deviation of the floating body from a reference position thereof.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Figure 1:
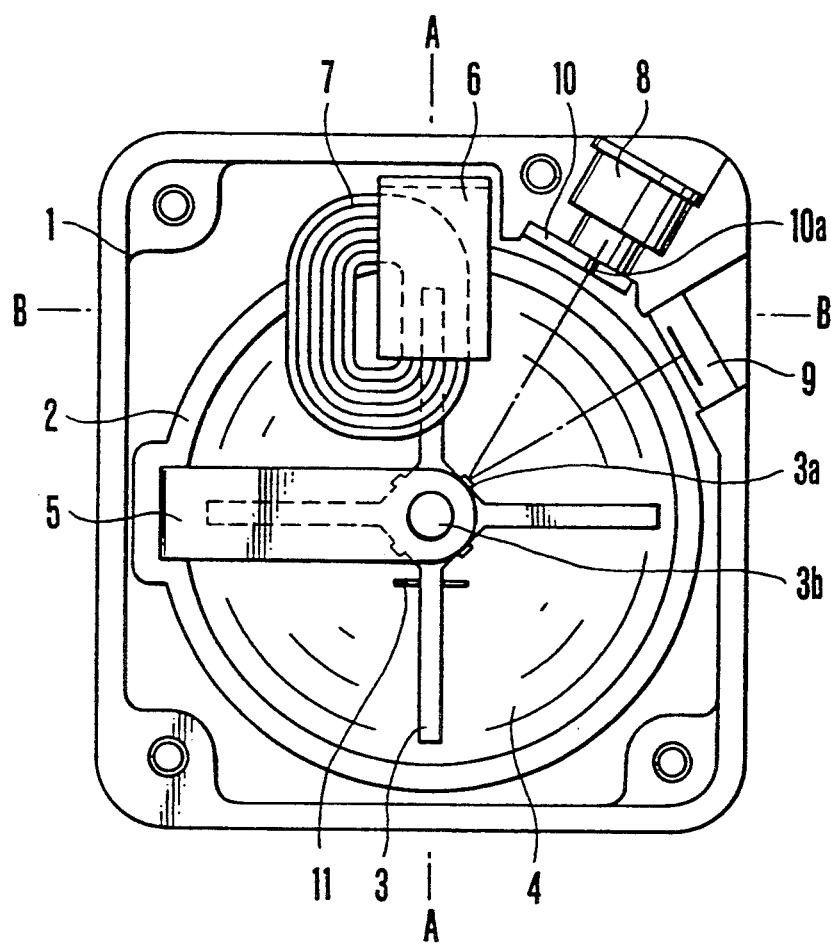
FIG. 1 is a schematic plan view showing a first embodiment of the mechanical construction of an angular displacement detecting device according to the present invention.

Preferred embodiments of the present invention will be described below with reference to the accompanying drawings.

FIGS. 1 to 4 schematically show a first embodiment of the mechanical construction of an angular displacement detecting device according to the present invention.

Referring to FIGS. 1 to 4, the illustrated angular displacement detecting device comprises a base plate 1 to which individual parts for constituting the device are secured in position, and a tubular casing 2 having a chamber in which a floating body 3 to be described later and a transparent liquid 4 are sealed. The floating body 3 is supported for rotation about an axis 3b by a floating-body support 5 which will be described later, and a slit-like reflecting surface is formed on a projection 3a. The floating body 3 is formed of a material consisting of a permanent magnet and is magnetized along the axis 3b. The floating body 3 is constructed so as to maintain the balance of rotation about the axis 3b and the balance of buoyancy.

The floating-body support 5 is secured to the tubular casing 2 in the state of supporting the floating body 3 by means of pivot bearings 13 which will be described later. A yoke 6 of U-like cross section is secured to the base plate 1, and cooperates with the floating body 3 to form a closed magnetic path. A wound coil 7 is disposed in fixed relation to the tubular casing 2 in the gap between the floating body 3 and the yoke 6. A light emitting element (iRED) 8 is secured to the base plate 1 and emits light by energization. A light receiving element (PSD) 9, whose output varies with the position where light is received, is also secured to the base plate 1. The light emitting element 8 and the light receiving element 9 constitute optical angular displacement detecting means of the type which transmits light by means of the projection (slit-like reflecting surface) 3a of the floating body 3.

A mask 10 is disposed at the front face of the light emitting element 8 and has a slit 10a for transmission of light. A stopper member 11 is secured to the tubular casing 2 for restricting the rotation of the floating body 3 to a predetermined range.

The above-described rotatable supporting of the floating body 3 is accomplished in the following manner. As shown in FIG. 2, which is a cross-sectional view taken along line A—A of FIG. 1, a pivot 12 having one pointed end is press-fitted into each of the top and bottom ends of the central portion of the floating body 3. Pivot bearings 13 are respectively secured to the upper and lower arms of the U-like shape of the above-described floating-body support 5 in such a manner that they are opposed to each other in the inward direction. The floating body 3 is supported by the engagement between the pointed ends of the pivots 12 and the corresponding pivot bearings 13.

A lid 14 is bonded to the tubular casing 2 in a sealed manner by a known art utilizing a silicone adhesive or the like, thereby sealing the liquid 4 in the tubular casing 2.

In the above-described arrangement, the floating body 3 has a symmetrical configuration about the rotational axis 3b so that an angular moment due to the influence of gravitation does not occur whatever attitude the floating body 3 may take. In addition, the floating body 3 is formed of a material having the same specific gravity as the liquid 4, so that substantial loads do not act on the pivots or the pivot bearings. In practice, it may be impossible to reduce unbalance components to zero. However, since errors in shape are substantially small enough to such an extent that only differences in specific gravity give rise to unbalance, it will be readily understood that the S/N ratio of friction to inertia is extremely high.

According to the above-described arrangement, even if the tubular casing 2 rotates about the rotational axis 3b, the liquid 4 inside of the tubular casing 2 is stationary with respect to absolute space owing to inertia and, therefore, the floating body 3 which is in a floating state does not rotate. As a consequence, the tubular casing 2 and the floating body 3 rotate about the rotational axis 3b with respect to each other. The relative angular displacement can be detected by the optical detecting means utilizing the light emitting element 8 and the light receiving element 9.

In the device having the above-described arrangement, detection of an angular displacement is performed in the following manner.

Light emitted from the light emitting element 8 passes through the slit 10a of the mask 10 and illuminates the floating body 3, and light reflected by the slit-like reflecting surface of the projection 3a reaches the light receiving element 9. During this light transmission, the light is approximately collimated by the slit 10a and the slit-like reflecting surface, whereby a sharply focused image (slit image) is formed on the light receiving element 9.

The tubular casing 2, the light emitting element 8 and the light receiving element 9 integrally move since all of them are secured to the base plate 1. If a relative angular displacement occurs between the tubular casing 2 and the floating body 3, the slit image on the light receiving element 9 will move by an amount corresponding to the relative angular displacement. Accordingly, the light receiving element 9, which utilizes a photoelectric conversion device whose output varies with the position where light is received, produces an output substantially proportional to the positional displacement of the slit image. It is, therefore, possible to detect the angular displacement of the tubular casing 2 by utilizing such an output as information.

As described above, the floating body 3 is formed of a permanent-magnet material having the same specific gravity as the liquid 4, for example, a material which is selected in the following manner.

A case where the above-described fluorine-contained inactive liquid is used as the liquid 4 will be considered. If the fine powder of a permanent-magnet material such as ferrite is added as a filler to a base consisting of a plastics material with the content of the permanent-magnet material appropriately adjusted, it is possible to easily prepare a material having a specific gravity approximately equal to 1.8-the specific gravity of the liquid 4-around a volume content of 8%. If the floating body 3 is magnetized along the axis 3b during or after the process of forming it out of such material, the floating body 3 having the nature of a permanent magnet can be obtained.

Figure 2:
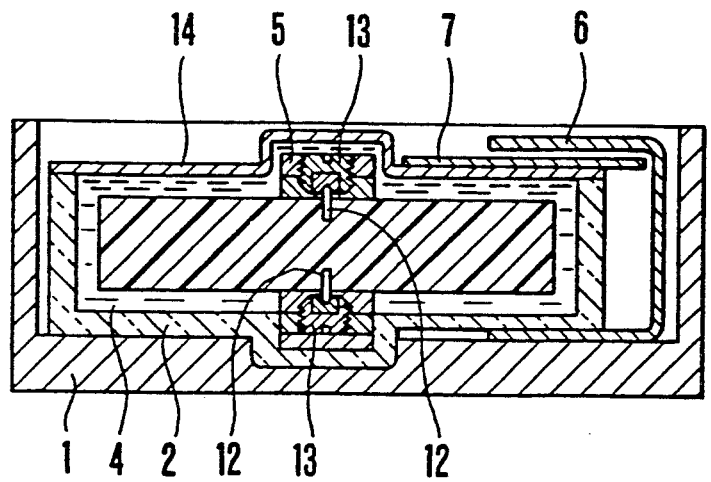
FIG. 2 is a cross-sectional view taken along line A—A of FIG. 1.
Figure 3:
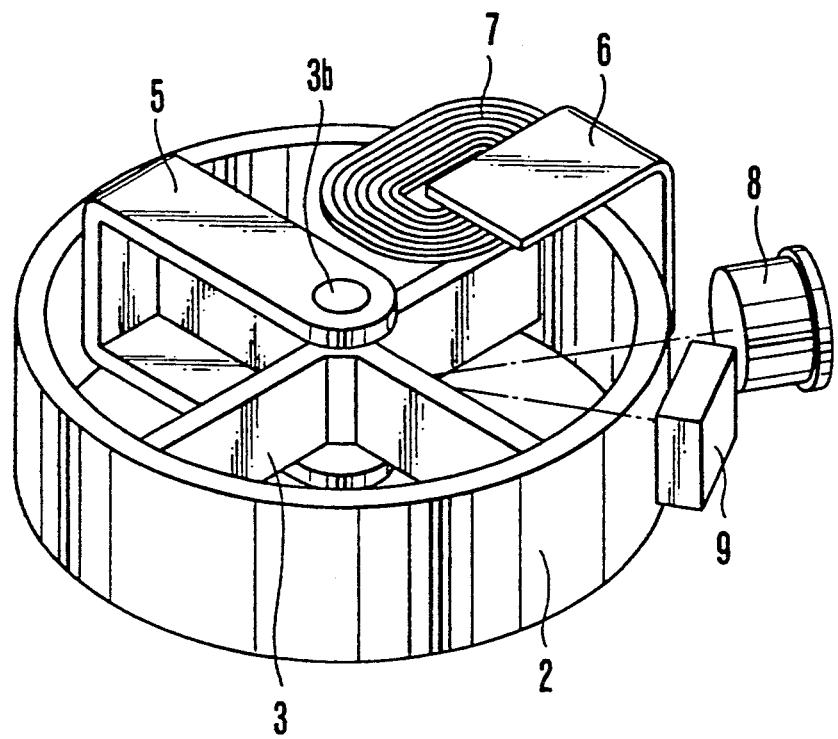
FIG. 3 is a schematic perspective view showing the mechanical construction of FIG. 1.
Figure 4:
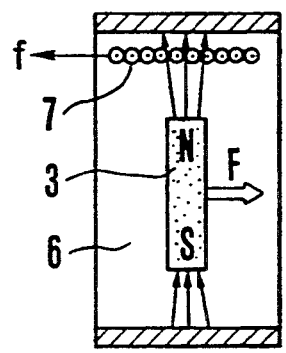
FIG. 4 is a cross-sectional view taken along line B—B of FIG. 1.

FIG. 4 is a cross-sectional view taken along line B—B of FIG. 1, representing the relationships between the floating body 3, the yoke 6 and the wound coil 7.

As shown, the floating body 3 is magnetized along the axis 3b and, as viewed in FIG. 1, the upper side and the lower side are magnetized to have a N-pole and a S-pole, respectively. A closed magnetic path is formed along which the magnetic lines of force exiting from the N-pole pass through the yoke 6 of U-like cross section and reach the S-pole. If an electric current is made to flow through the wound coil 7 from the reverse side to the obverse side of the drawing as viewed in FIG. 4, the wound coil 7 is subject to a force in the direction of an arrow f in accordance with Fleming's left-hand rule. However, the wound coil 7 does not move because it is secured to the tubular casing 2 as described previously, with the result that a force works as a reaction in the direction of an arrow F, thereby driving the floating body 3. Needless to say, this force is proportional to the electric current flowing in the wound coil 7 and the direction of the force is reversed if an electric current is made to flow in the opposite direction. As is apparent from the foregoing, according to the arrangement of the first embodiment, the floating body 3 can be freely driven.

The closed magnetic path formed by the floating body 3 and the yoke 6 in the above-described arrangement will now be considered. In the conventional arrangement, since the floating body having an extremely low magnetic permeability forms a permanent magnet in itself, the magnetic resistance of the closed magnetic path is extremely low. For this reason, the conventional arrangement requires that an excessive electric current be made to flow through the solenoid coil for the purpose of forming a magnetic field against the magnetic resistance. In contrast, the arrangement of the first embodiment is such that the floating body 3 is driven by an electromagnetic driving force which is generated by the wound coil 7 disposed in the magnetic field produced by the permanent magnet. Accordingly, the efficiency of electromagnetic conversion is remarkably improved and an energy-saving type of device can be realized.

Figure 5:
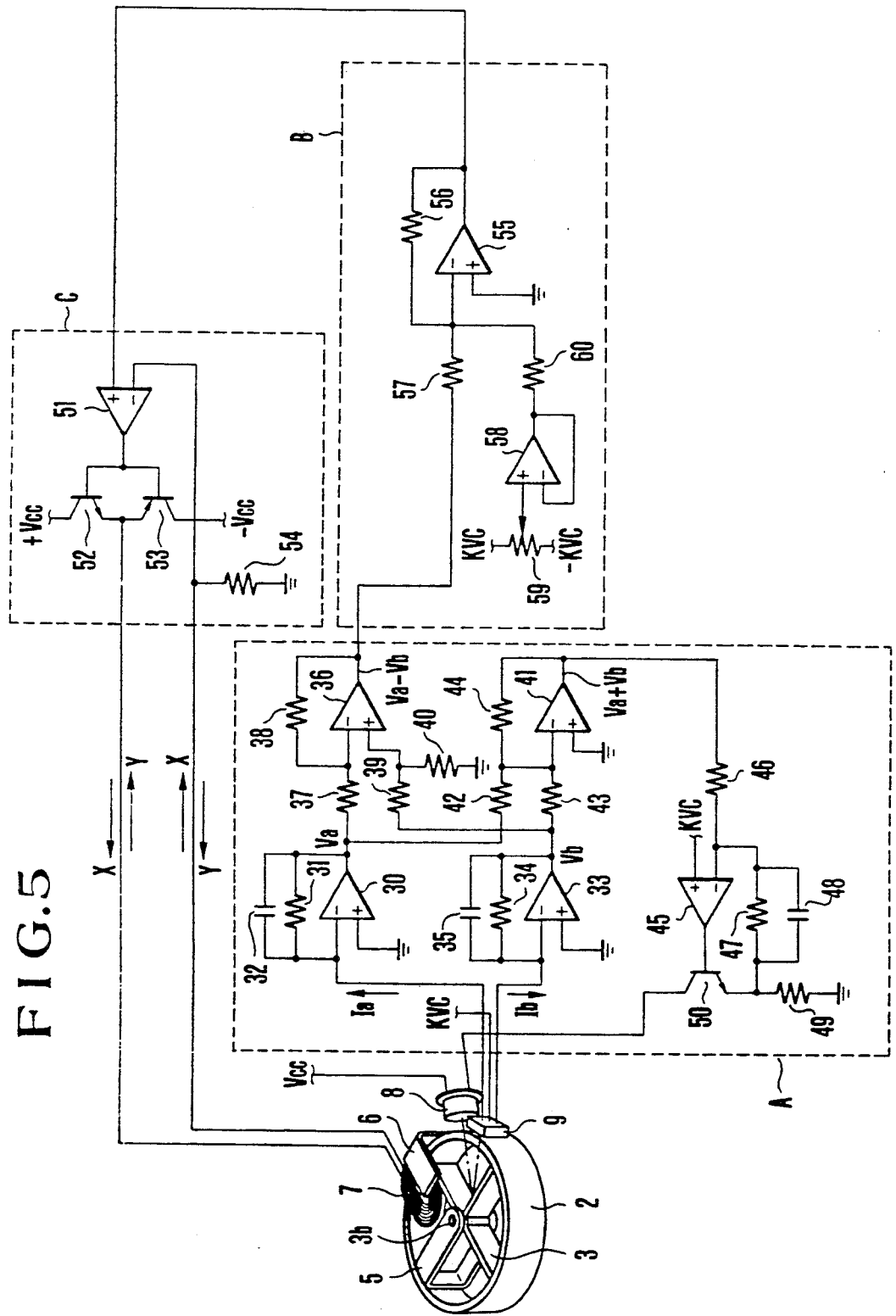
FIG. 5 is a circuit diagram showing a first embodiment of the electrical construction of the angular displacement detecting device according to the present invention.

FIG. 5 shows a first embodiment of the circuit construction which provides control over the above-described mechanical arrangement according to the present invention.

The block A of FIG. 5 indicates a position detecting circuit for detecting the position of the floating body 3 with respect to the tubular casing 2. The basic arrangement of the position detecting circuit is such that the reflected light from the floating body 3 of the infrared light emitted from the light emitting element 8 is detected by the light receiving element 9 for position detection.

Light currents Ia and Ib which are generated by the light receiving element 9 are, as is known, separated in accordance with the position of intensity center of infrared light incident on the light receiving element 9. The light current Ia is converted into a voltage Va by a current-to-voltage conversion circuit formed by an operational amplifier 30, a resistor 31 and a capacitor 32, while the light current Ib is converted into a voltage Vb by a current-to-voltage conversion circuit formed by an operational amplifier 33, a resistor 34 and a capacitor 35. The voltages Va and Vb are applied to a differential amplifier, disposed in the next stage, formed by an operational amplifier 36 and resistors 37, 38, 39 and 40, and a difference signal (Va−Vb) is obtained. The voltages Va and Vb are also applied to an adding amplifier formed by an operational amplifier 41 and resistors 42, 43 and 44, and a sum signal (Va+Vb) is obtained. Since the sum signal (Va+Vb) is coupled to the inverting input terminal of an operational amplifier 45 via a resistor 46, an iRED driver circuit of the constant current type formed by the operational amplifier 45, a feedback resistor 47, a current-value detecting resistor 49 and a transistor 50 varies the magnitude of electric current to be supplied to the light emitting element 8 in accordance with the value of the sum signal (Va+Vb). As a consequence, negative feedback control is provided to make the sum signal (Va+Vb) equal to a reference voltage KVC applied to the non-inverting input terminal of the operational amplifier 45.

The capacitor 48 serves as a phase compensating capacitor for preventing oscillation of the feedback loop, and determines the band of the entire feedback loop in combination with the resistor 47.

As described above, by maintaining the light current generated by the light receiving element 9 at a constant level, the difference signal (Va−Vb) between the two outputs of the light receiving element 9 can be rendered as a signal which consistently correctly indicates the relative position between the tubular casing 2 and the floating body 3 irrespective of variations in the temperature of the light receiving element 8, the non-uniformity of the characteristics of individual elements, etc.

The block B of FIG. 5 indicates an arithmetic circuit for determining sensor parameters in the first embodiment.

The difference signal (Va−Vb) which is the output from the operational amplifier 36 is coupled to the inverting input terminal of an operational amplifier 55 through a gain setting resistor 57. Since a feedback resistor 56 is connected to the operational amplifier 55, the parameter of the entire device is set on the basis of the values of the gain setting resistors 57 and 56. A reference potential set by a variable resistor 59 is coupled to the non-inverting input terminal of the operational amplifier 58. The output of a buffer amplifier formed by the operational amplifier 58 is coupled to the non-inverting input terminal of the operational amplifier 55 through a resistor 60. Accordingly, the DC level of the operational amplifier 55 is varied in accordance with the value set by the variable resistor 59.

The block C of FIG. 5 indicates a driver circuit part for driving the wound coil 7, and a push-pull type constant current circuit is formed by an operational amplifier 51, transistors 52, 53 and a current detecting resistor 54. The circuit part can cause an electric current to flow in either of the directions indicated by arrows X and Y in FIG. 5, whereby an electric current proportional to the output voltage of the operational amplifier 55 applied to the non-inverting input terminal of the operational amplifier 51 is supplied to the wound coil 7.

According to the above-described circuit arrangement, by supplying the wound coil 7 with an electric current proportional to a difference signal corresponding to the relative position between the tubular casing 2 and the floating body 3, that is, the relative position signal (Va−Vb), a force according to Fleming's left-hand rule is, as described above, generated in the closed magnetic path formed by the floating body 3 and the yoke 6. Since such force is naturally proportional to the current value of the wound coil 7, a force proportional to the relative position between the tubular casing 2 and the floating body 3 is generated.

Figure 6:
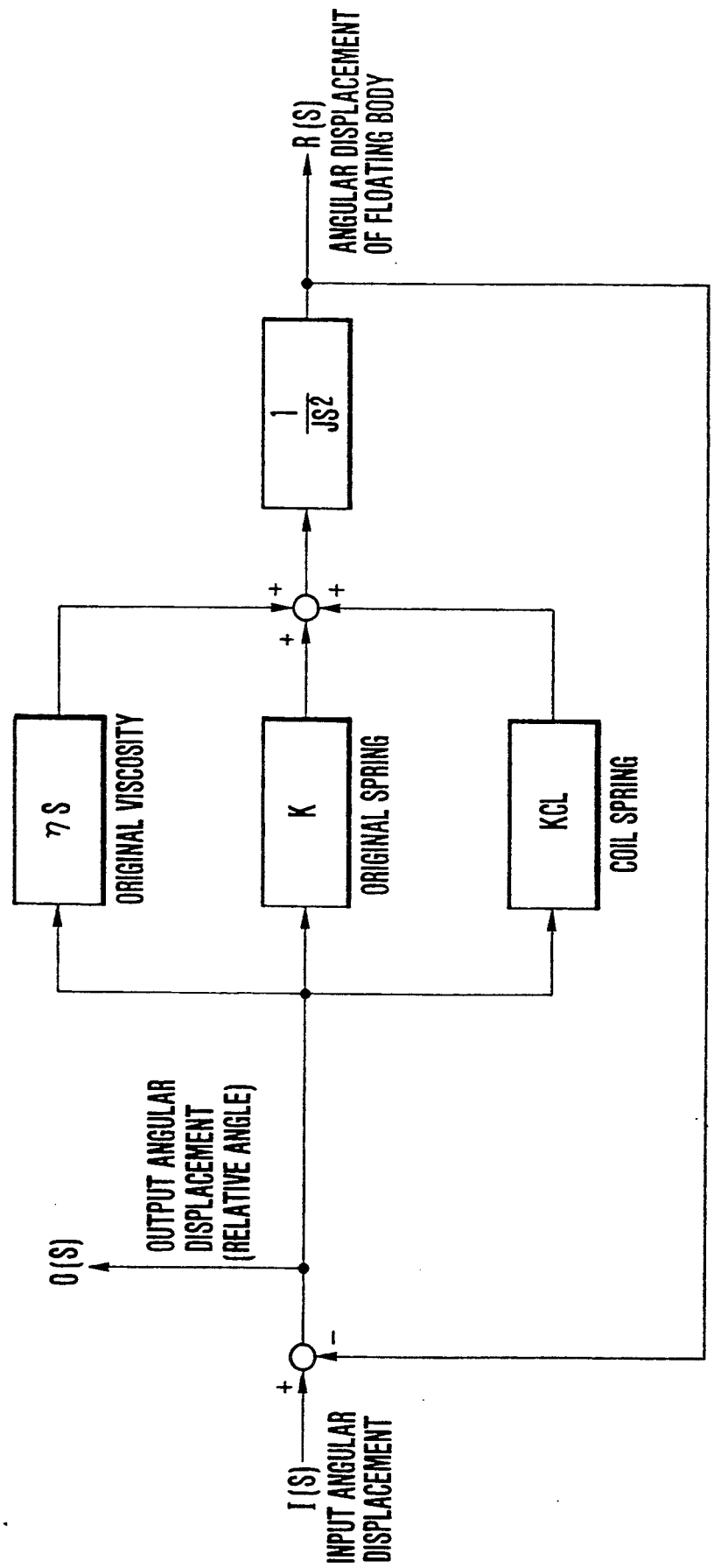
FIG. 6 is a schematic block diagram which serves to illustrate the circuit characteristics of the electrical construction of FIG. 5.

The characteristics of the angular displacement detecting device according to the first embodiment will now be described with reference to the frequency transfer characteristic shown in FIG. 6.

An input I(S) indicates the displacement of the tubular casing 2 with respect to absolute space. An output angular displacement O(S), which is detected by the device according to the first embodiment, is detected on the basis of the relative relationship between the input angular displacement I(S) and the displacement R(S) of the floating body 3 with respect to the absolute space. Therefore, the output angular displacement O(S) is represented by the following equation:

$$O(S) = I(S) - R(S) \quad (1)$$

The output angular displacement O(S) is the relative angular displacement between the tubular casing 2 and the floating body 3, and a viscosity force $\eta SO(S)$ which is proportional to the relative velocity between the tubular casing 2 and the floating body 3 is produced owing to the viscosity of the liquid 4 sealed in the tubular casing 2, as described in connection with the conventional example. In theory, if the width of the yoke 6 is infinitely large with respect to the direction of movement of the floating body 3, no force based on magnetic force occurs while the wound coil 7 is not being energized. However, in practice, since the width of the yoke 6 is finite, a spring force KO(S) also works as a weak force. Further, in the first embodiment, it is possible to apply a new spring force by generating a force by supplying the wound coil 7 with an electric current proportional to the relative displacement between the tubular casing 2 and the floating body 3 by means of the above-described method. In the first embodiment, a spring force KCLO(S), which is derived from the energization of the coil, acts in the direction in which the original spring force KO(S) is increased, and an arbitrary magnitude of spring force can be produced on the basis of the value of the gain setting resistor 57.

On the assumption that the above-described forces work on the floating body 3, if the moment of inertia J of the liquid 4 sealed in the tubular casing 3 is used to express the angular displacement R(S) of the floating body 3 with respect to absolute space, the following equation is obtained:

$$R(S) = \frac{1}{JS^2} \cdot (K + \eta S + KCL)O(S) \quad (2)$$

If the transfer characteristic of the first embodiment is expressed by using Equations (1) and (2), the following equation is obtained:

$$\frac{O(S)}{I(S)} = \frac{JS^2}{JS^2 + \eta S + (K + KCL)} \quad (3)$$

Equation (3) represents the characteristic of a high-pass filter of second order, and it is obvious that its frequency characteristic is determined by the spring force produced by the wound coil 7.

Since the DC level of the operational amplifier 55 varies with the value of the variable resistor 59, the direct current which is supplied to the would coil 7 also similarly varies. Accordingly, it is possible to electrically freely control the reference potential of the floating body 3 by utilizing the current value of the wound coil 7.

Figure 7:
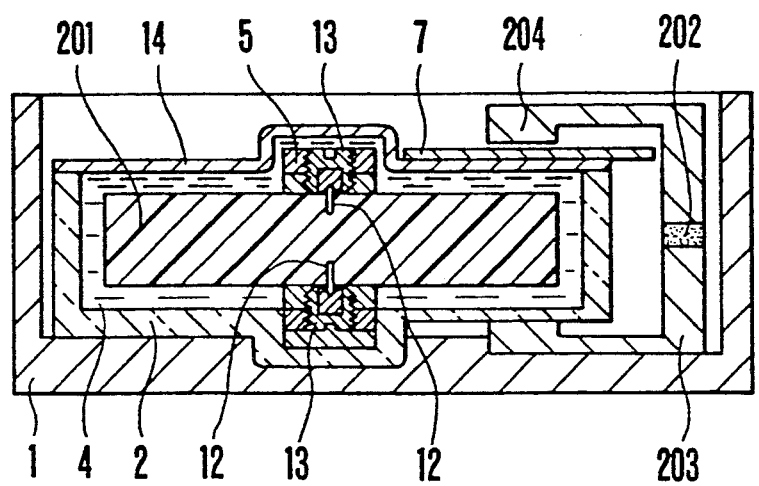
FIG. 7 is a central cross-sectional view showing a second embodiment of the mechanical construction of an angular displacement detecting device according to the present invention.

FIG. 7 is a cross-sectional view showing a second embodiment of the mechanical construction of an angular displacement detecting device according to the present invention. In FIG. 7, like reference numerals are used to denote members which perform functions substantially identical to those of the members used in the mechanical construction of the first embodiment, and a description thereof is omitted.

A floating body 201 is made of a material having magnetic characteristics, for example, a material in which iron powder of high magnetic permeability is contained in a plastics material base. As in the mechanical construction of the first embodiment, the floating body 201 is supported for rotation about the axis 3b by the floating-body support 5, and a slit-like reflecting surface is formed on a projection (not shown) which corresponds to the projection 3a of FIG. 1. A closed magnetic path is formed among a permanent magnet 202, a yoke 203, the floating body 201, a yoke 204 and the permanent magnet 202.

This closed magnetic path forms a closed magnetic path similar to that shown in FIG. 4, which illustrates the mechanical construction of the first embodiment. Accordingly, if an electric current is made to flow through the wound coil 7 disposed in the magnetic path, the wound coil 7 is subject to a force in accordance with Fleming's left-hand rule. Thus, the floating body 201 is driven by a force which works as a reaction, as in the case of the mechanical construction of the first embodiment.

As is apparent from the foregoing description, in the mechanical construction of the second embodiment as well, it is possible to achieve advantages similar to those of the mechanical construction of the first embodiment.

Since an electric circuit for providing operation control is substantially identical to that used in the first embodiment, a description thereof is omitted.

Figure 8:
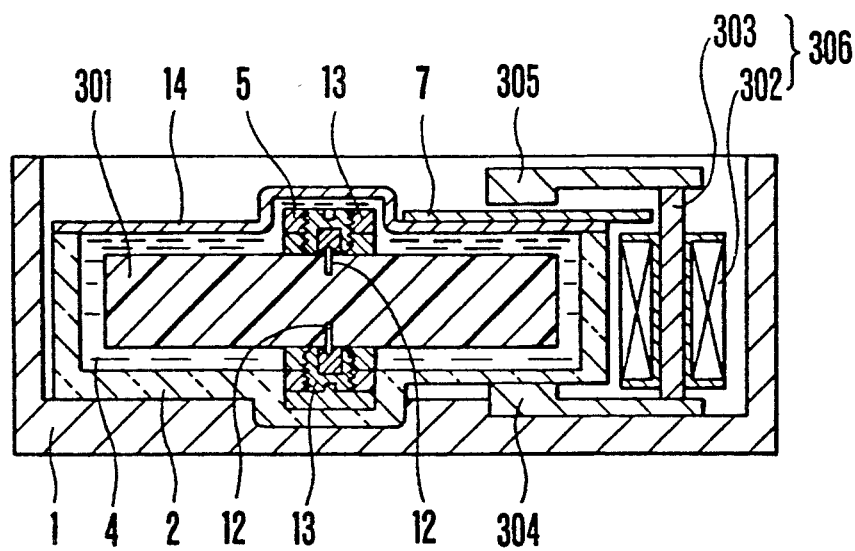
FIG. 8 is a central cross-sectional view showing a third embodiment of the mechanical construction of an angular displacement detecting device according to the present invention.

FIG. 8 is a cross-sectional view showing a third embodiment of the mechanical construction of an angular displacement detecting device according to the present invention. In FIG. 8, like reference numerals are used to denote members which perform functions substantially identical to those of the members used in the mechanical construction of the first embodiment, and a description thereof is omitted.

A floating body 301 is made of a material having magnetic characteristics, for example, a material in which iron powder of high magnetic permeability is contained in a plastics material base. As in the mechanical construction of the first embodiment, the floating body 301 is supported for rotation about the axis 3b by the floating-body support 5, and a slit-like reflecting surface is formed on a projection (not shown) which corresponds to the projection 3a of FIG. 1. A coil bobbin 302 has a construction in which a coil is wound around a bobbin, and an iron core 303 extends through the center of the coil bobbin 302 to constitute a known electromagnet device 306. A closed magnetic path is formed among an electromagnet device 306, a yoke 204, the floating body 301, a yoke 305 and the electromagnet device 306.

In the above-described arrangement, if an electric current is made to flow through the coil bobbin 302, the iron core 303 is magnetized so that a closed magnetic path similar to that shown in FIG. 4 is formed. Accordingly, if an electric current is made to flow through the wound coil 7 disposed in the magnetic path, the wound coil 7 is subject to a force in accordance with Fleming's left-hand rule. Thus, the floating body 301 is driven by a force which works as a reaction, as in the case of the mechanical construction of the first embodiment.

Figure 9:
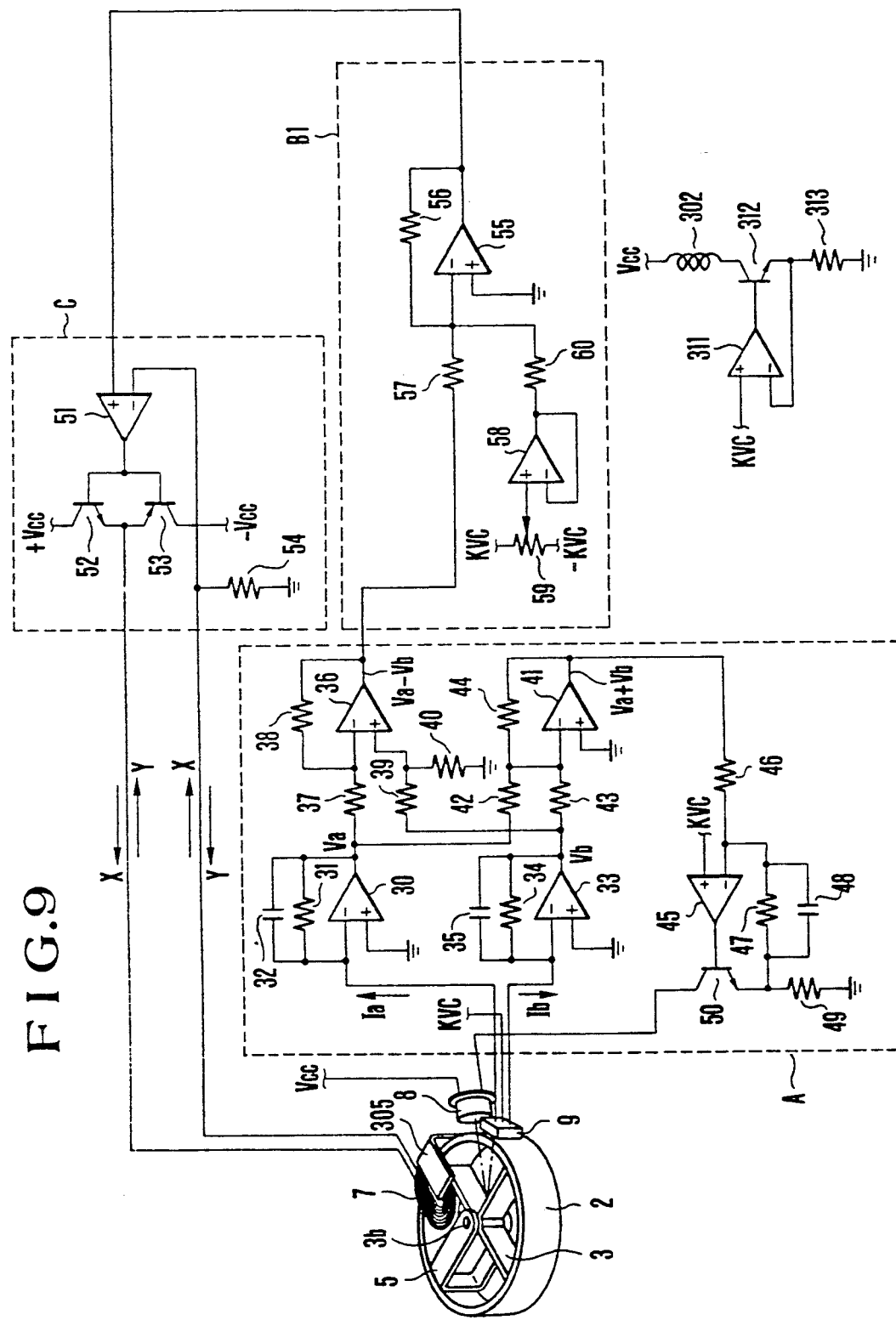
FIG. 9 is a circuit diagram showing a second embodiment of an electrical construction associated with the mechanical construction of FIG. 8.

FIG. 9 is a block diagram showing the circuit arrangement used in the embodiment of FIG. 8. This circuit arrangement includes, in addition to the circuit of FIG. 5, a constant current driver circuit for energizing the electromagnet device 306, which is formed by an operational amplifier 311, a transistor 312 and a resistor 313. The electromagnet device 306 (coil bobbin 302) is supplied with an electric current obtained by dividing a reference voltage KVC coupled to the non-inverting input terminal of the operational amplifier 311 by the resistance of the resistor 313, whereby a force is produced as described above.

Figure 10:
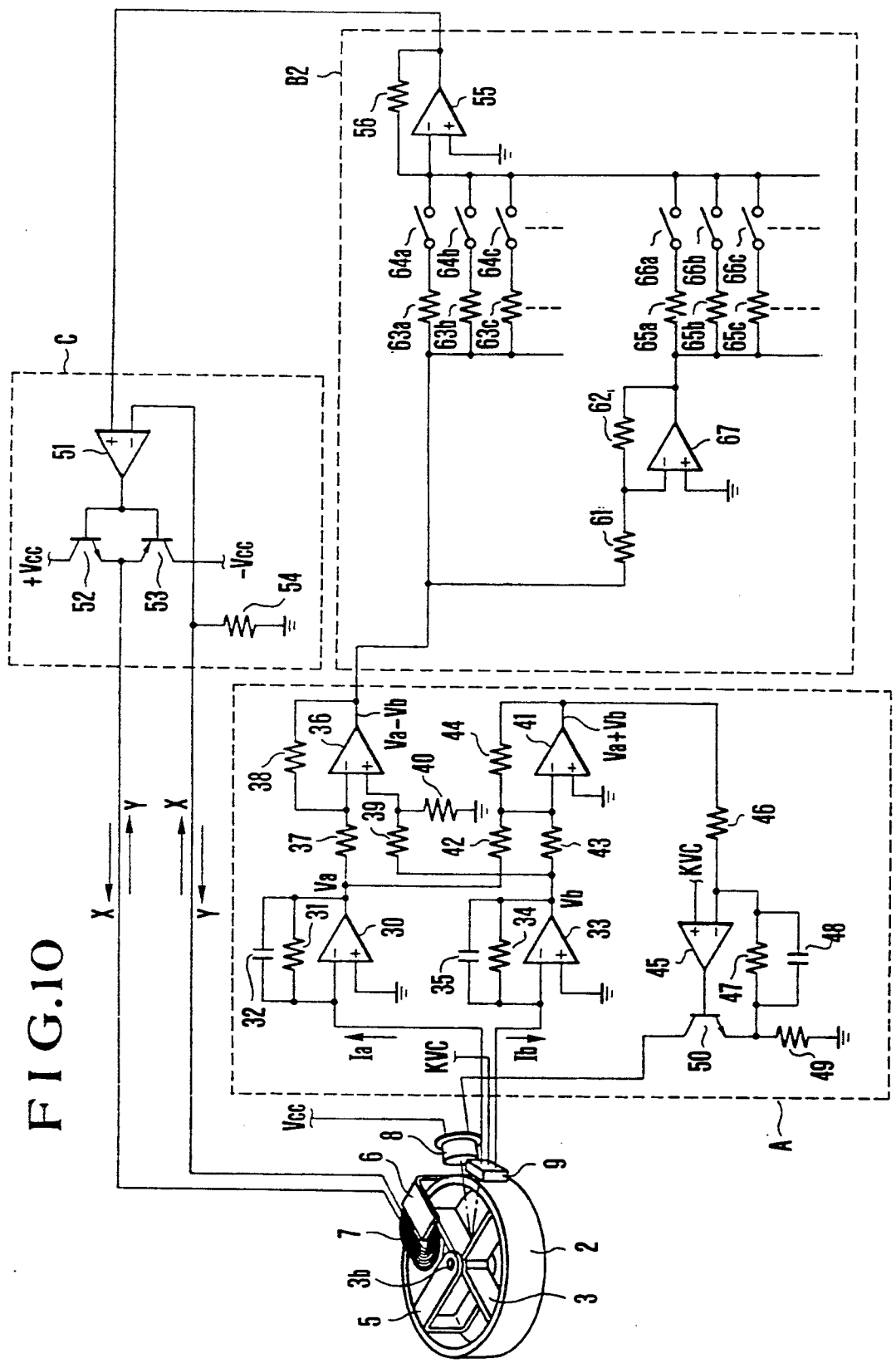
FIG. 10 is a circuit diagram showing a third embodiment of the electrical construction of the angular displacement detecting device according to the present invention.

FIG. 10 shows a third embodiment of the electrical construction of an angular displacement detecting device according to the present invention, and this electrical construction includes a plurality of spring constant setting means as parameters.

In such electrical construction, the position detecting circuit block A and the driver circuit block C are substantially identical to the corresponding blocks shown in FIG. 5. In FIG. 10, like reference numerals are used to denote elements which are similar to those shown in FIG. 5, and a description thereof is omitted.

In FIG. 10, a block B2 represents a spring constant setting and switching circuit for setting and switching a plurality of spring constants in the third embodiment. A relative position signal (Va−Vb) indicative of the relative position between the tubular casing 2 and the floating body 3 is applied to the inverting input terminal of the operational amplifier 55 through a plurality of gain setting resistors 63a, 63b, 63c, . . . and a plurality of gain selecting switches 64a, 64b, 64c, . . . The relative position signal (Va−Vb) is simultaneously applied to an inverting amplifier formed by an operational amplifier 67 and resistors 61 and 62. The output of the inverting amplifier is applied to the inverting input terminal of the operational amplifier 55 through a plurality of gain setting resistors 65a, 65b, 65c, . . . and a plurality of gain selecting switches 66a, 66b, 66c, . . . Since the feedback resistor 56 is connected to the operational amplifier 55, a gain is set by a selective combination of the gain setting resistors 63a, 63b, 66c, . . . and 65a, 65b, 65c, . . . in accordance with the ON/OFF state of each of the gain selecting switches 64a, 64b, 64c, . . . and 66a, 66b, 66c, . .

Since the output of the operational amplifier 55 is provided to an input of the driver circuit block C, the wound coil 7 is supplied with a coil current which is proportional to the relative displacement between the tubular casing 2 and the floating body 3 and whose proportionality factor can be set and switched by the block B2, whereby a spring force works on the floating body 3 as described above.

Since the spring force set by the gain setting resistors 63a, 63b, 63c, . . . apparently works in the direction in which it is added to the original spring force 64c, . . . to be switched on increases, a corresponding apparent spring force increases. As for the spring force set by the gain setting resistors 65a, 65b, 65c, . . . , since the relative position signal (Va−Vb) is applied in an inverted state, a corresponding apparent spring force decreases as the number of gain selecting switches 65a, 65b, 65c, . . . to be switched on increases.

Figure 11:
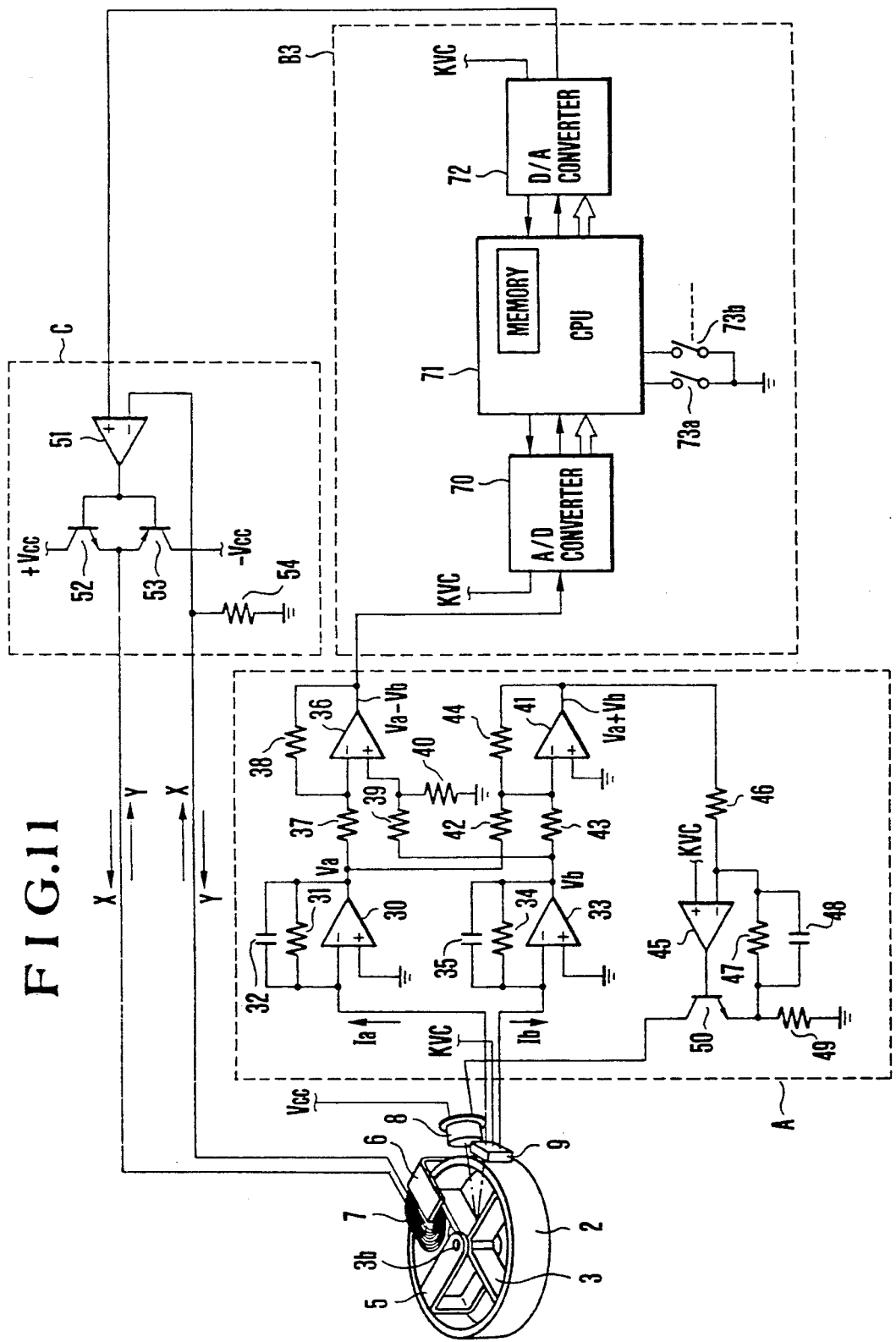
FIG. 11 is a circuit diagram showing a fourth embodiment of the electrical construction of the angular displacement detecting device according to the present invention.
Figures 12, 13:
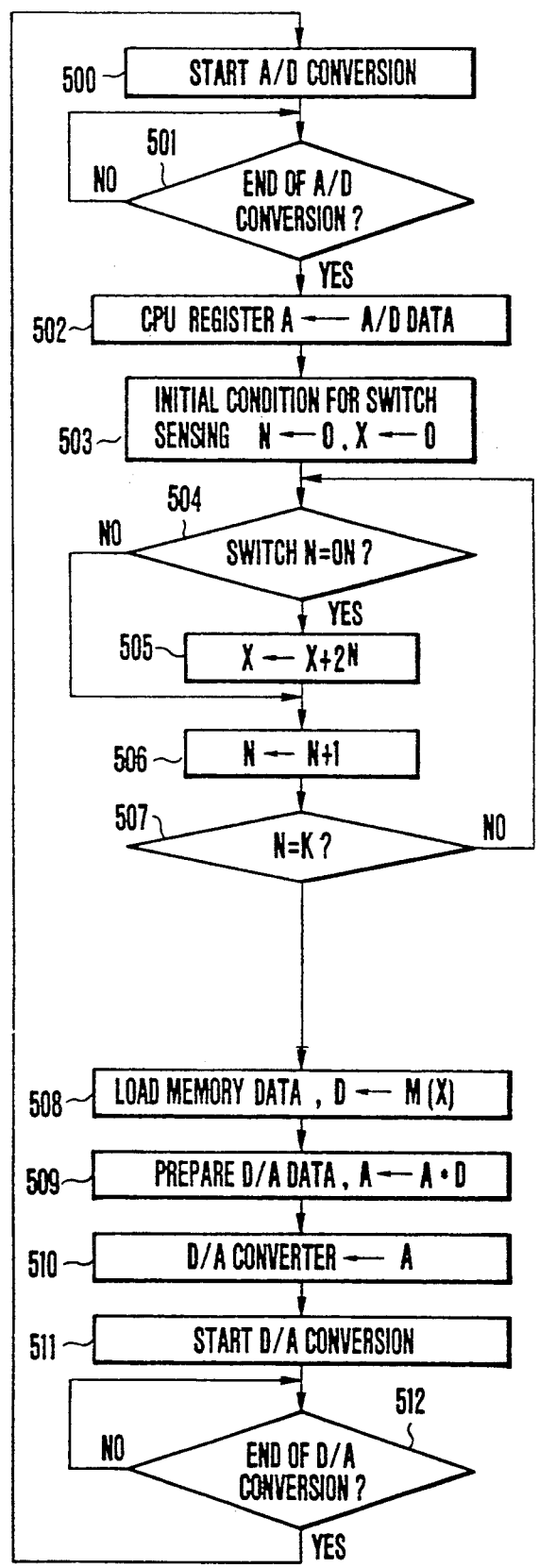
FIG. 12 is a flow chart showing the operations of the essential portions shown in FIG. 11.
FIG. 13 is a view showing a memory data table used in the embodiment of FIG. 11.

FIG. 11 is a block diagram showing a fourth embodiment of the electrical construction of an angular displacement detecting device according to the present invention, in which a plurality of spring constants are digitally set as parameters. FIG. 12 shows a flow chart of the operation of the fourth embodiment. In such electrical construction, the position detecting circuit block A and the driver circuit block C are substantially identical to the corresponding blocks shown in FIG. 5. In FIG. 11, like reference numerals are used to denote elements which are similar to those shown in FIG. 5, and a description thereof is omitted.

In FIG. 11, a block B3 represent a control circuit for providing digital control in this embodiment. The block B3 comprises an A/D converter 70 for converting analog data into digital data, a central processing unit (CPU) 71 for performing global arithmetic operations as well as state detection and a D/A converter 72 for outputting analog data on the basis of data supplied from the CPU 71. Parameter setting switches 73a, 73b, . . . are connected to the CPU 71.

The operation of the fourth embodiment will be described below with reference to the flow chart shown in FIG. 12.

In Step 500, the A/D converter 70 initiated A/D conversion of the relative position signal (Va−Vb) indicative of the relative position between the tubular casing 2 and the floating body 3 in response to an A/D control signal from the CPU 71. In Step 501, it is determined whether the A/D conversion has been completed. If the A/D conversion has been completed, the process proceeds to Step 502, where the result of the A/D conversion is transferred form the A/D converter 70 to a register A in the CPU 71. In Step 503, an initial condition for switch sensing is set so that a counter N and the value of a register X are each reset to zero.

In Step 504, it is determined whether the state of a switch N (N=0: 73a, N=1: 73b, . . .) is ON. If it is ON, the process proceeds to Step 505, where $2^N$ is added to the value of the register X. If it is OFF, the addition is omitted and the process jumps to Step 506. In Step 506, the value of the counter N is incremented by one and then, in Step 507, it is determined whether the value of the counter N has reached "K". If "K" has not yet been reached, the process returns to Step 504, where the state detection of the switch is again performed. If "K" has been reached, the state detection of the switch is completed.

In Steps 504 to 507, $2^K$ combinations are determined on the basis of the states of K switches. Accordingly, if corresponding data are stored n a memory table as shown in FIG. 13, it is possible to freely select a parameter according to the states of the switches.

Since a predetermined memory address is set in the register X, data M(X) corresponding to this address is, in Step 508, transferred to a register D in the CPU 71. In Step 509, the value of the register A is multiplied by the value of the register D and the result is held in the register A. In Step 501, the value of the register A is transferred to the D/A converter 72. In Step 511, D/A conversion is initiated and, in Step 512, it is determined whether the D/A conversion has been completed. If the D/A conversion is completed, the process returns to Step 500.

Since the output of the D/A converter 72 is connected to an input port of the driver circuit block C, an electrical current proportional to the output of the D/A converter 72 is supplied to the wound coil 7. Accordingly, in the fourth embodiment, it is possible to vary a proportionality factor, i.e., a spring force, on the basis of the states of the parameter setting switches 73a, 73b, . . .

Figure 14:
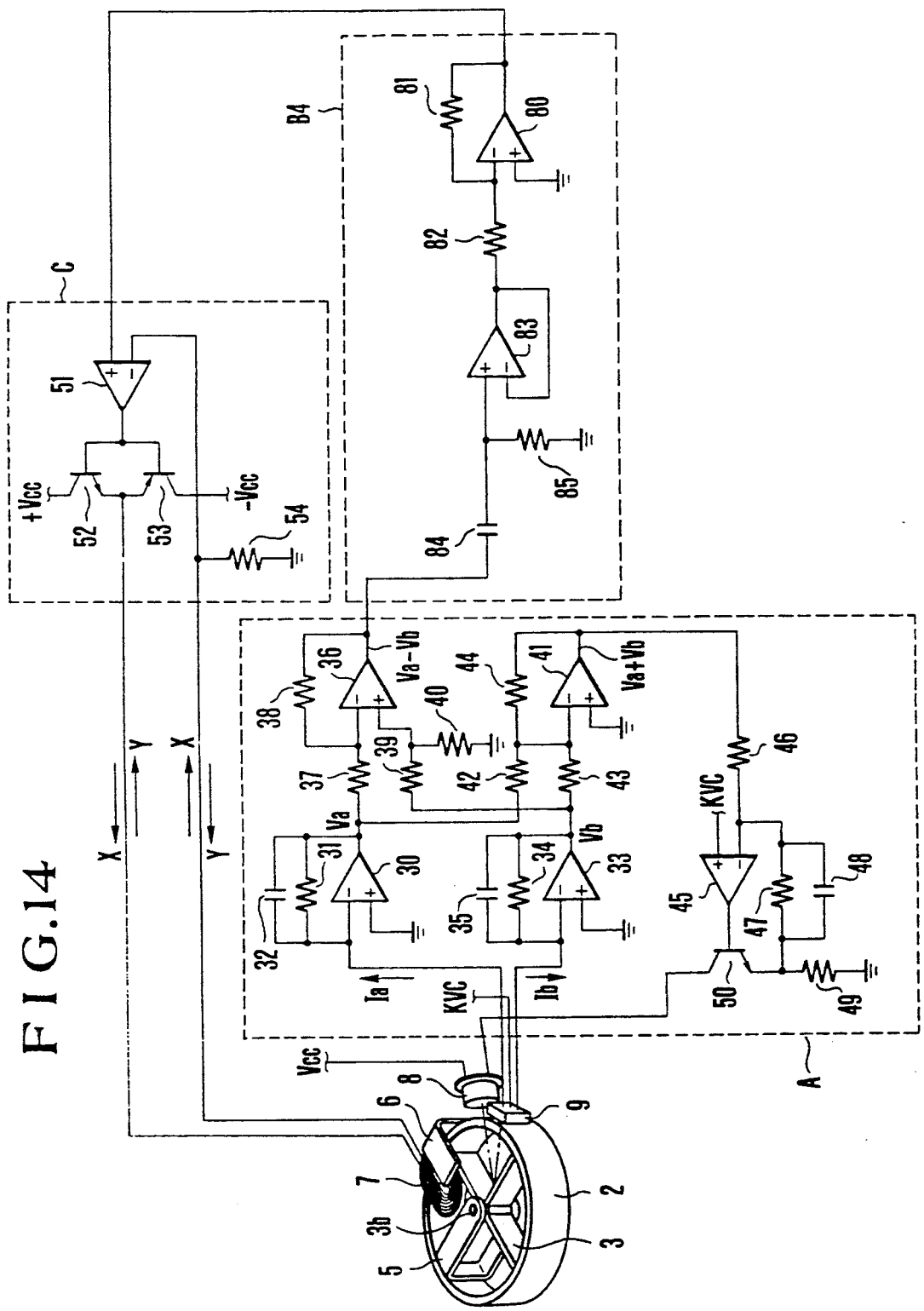
FIG. 14 is a circuit diagram showing a fifth embodiment of the electrical construction of the angular displacement detecting device according to the present invention.

FIG. 14 shows a fifth embodiment of the electrical construction of an angular displacement detecting device according to the present invention.

In this electrical construction, the position detecting circuit block A and the driver circuit block C are substantially identical to the corresponding blocks shown in FIG. 5. In FIG. 14, like reference numerals are used to denote elements which are similar to those shown in FIG. 5, and a description thereof is omitted.

In FIG. 14, a block B4 represents an arithmetic circuit for determining sensor parameters in the fifth embodiment. A relative position signal (Va−Vb) which is the output from the operational amplified 36 is coupled to the non-inverting input terminal of the operational amplifier 83 through a capacitor 84. A circuit formed by the operational amplifier 83, a resistor 85 and the capacitor 84 operates as a differentiating circuit with respect to a frequency which is sufficiently lower than the frequency determined by a capacitance C and a resistance R, i.e., $f = \frac{1}{2\pi CR}$. The output of the operational amplifier 83 is coupled to the inverting input terminal of an operational amplifier 80 through a gain setting resistor 82, and a feedback resistor 81 is connected to the operational amplifier 80. Accordingly the output of the operational amplifier 83 is amplified to a value proportional to the differential value of the difference signal (Va−Vb) in accordance with the value of the gain setting resistor 82, whereby the parameters for the entire device are set.

According to the above-described circuit arrangement, by supplying the wound coil 7 with an electric current proportional to the differential value of a difference signal indicative of the relative position between the tubular casing 2 and the floating body 3, that is, the relative position signal (Va−Vb), a force according to Fleming's left-hand rule, is as described above, generated in the closed magnetic path formed by the floating body 3 and the yoke 6. Since such force is naturally proportional to the current value of the wound coil 7, a force proportional to the relative velocity between the tubular casing 2 and the floating body 3 is generated.

Figure 15:
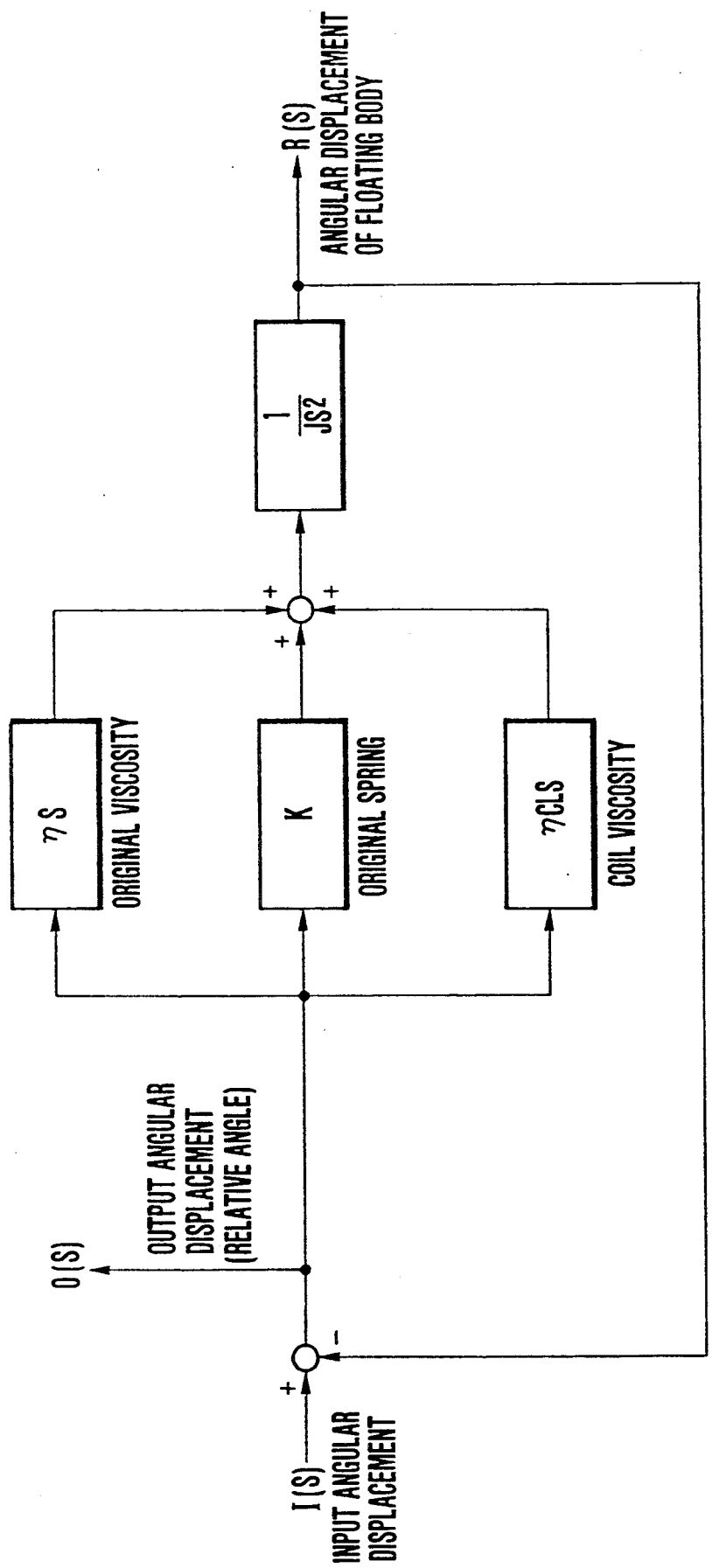
FIG. 15 is a schematic block diagram which serves to illustrate the circuit characteristics of the electrical construction of FIG. 14.

The characteristics of the angular displacement detecting device according to the fifth embodiment will now be described with reference to the frequency transfer characteristic shown in FIG. 15.

As input I(S) indicates the displacement of the tubular casing 2 with respect to absolute space. An output angular displacement O(S), which is detected by the device according to the fifth embodiment, is detected on the basis of the relative relationship between the input angular displacement I(S) and the displacement R(S) of the floating body 3 with respect to the absolute space. Therefore, the output angular displacement O(S) is represented by the following equation:

$$O(S) = I(S) - R(S) \qquad (4)$$

The output angular displacement O(S) is the relative angular displacement between the tubular casing 2 and the floating body 3, and a viscosity force $\eta SO(S)$ which is proportional to the relative velocity between the tubular casing 2 and the floating body 3 is produced owing to the viscosity of the liquid 4 sealed in the tubular casing 2, as described in connection with the conventional example. In theory, if the width of the yoke 6 is infinitely large with respect to the direction of movement of the floating body 3, no force based on magnetic force occurs while the wound coil 7 is not being energized. However, in practice, since the width of the yoke 6 is finite, a spring force KO(S) also works as a weak force. Further, in the fifth embodiment, it is possible to apply a new viscosity force by generating a force by supplying the wound coil 7 with an electric current proportional to the differential value of the relative displacement between the tubular casing 2 and the floating body 3 by means of the above-described method. In the fifth embodiment, a viscosity force $\eta CLSO(S)$, which is derived from the energization of the coil, acts in the direction in which the original viscosity force $\eta SO(S)$ is increased, and an arbitrary magnitude of viscosity force can be produced on the basis of the value of the gain setting resistor 82.

On the assumption that the above-described forces work on the floating body 3, if the moment of inertia J of the liquid 4 sealed in the tubular casing 2 is used to express the angular displacement R(S) of the floating body 3 with respect to absolute space, the following equation is obtained:

$$R(S) = \frac{1}{JS^2} \cdot (K + \eta S + \eta CLS)O(S) \qquad (5)$$

If the transfer characteristic of the fifth embodiment is expressed by using Equations (4) and (5), the following equation is obtained:

$$\frac{O(S)}{I(S)} = \frac{JS^2}{JS^2 + (\eta + \eta CL)S + K} \qquad (6)$$

Equation (6) represents the characteristic of a high-pass filter of second order, and it is apparent that its frequency characteristic is determined by the viscosity force produced by the would coil 7.

Figure 16:
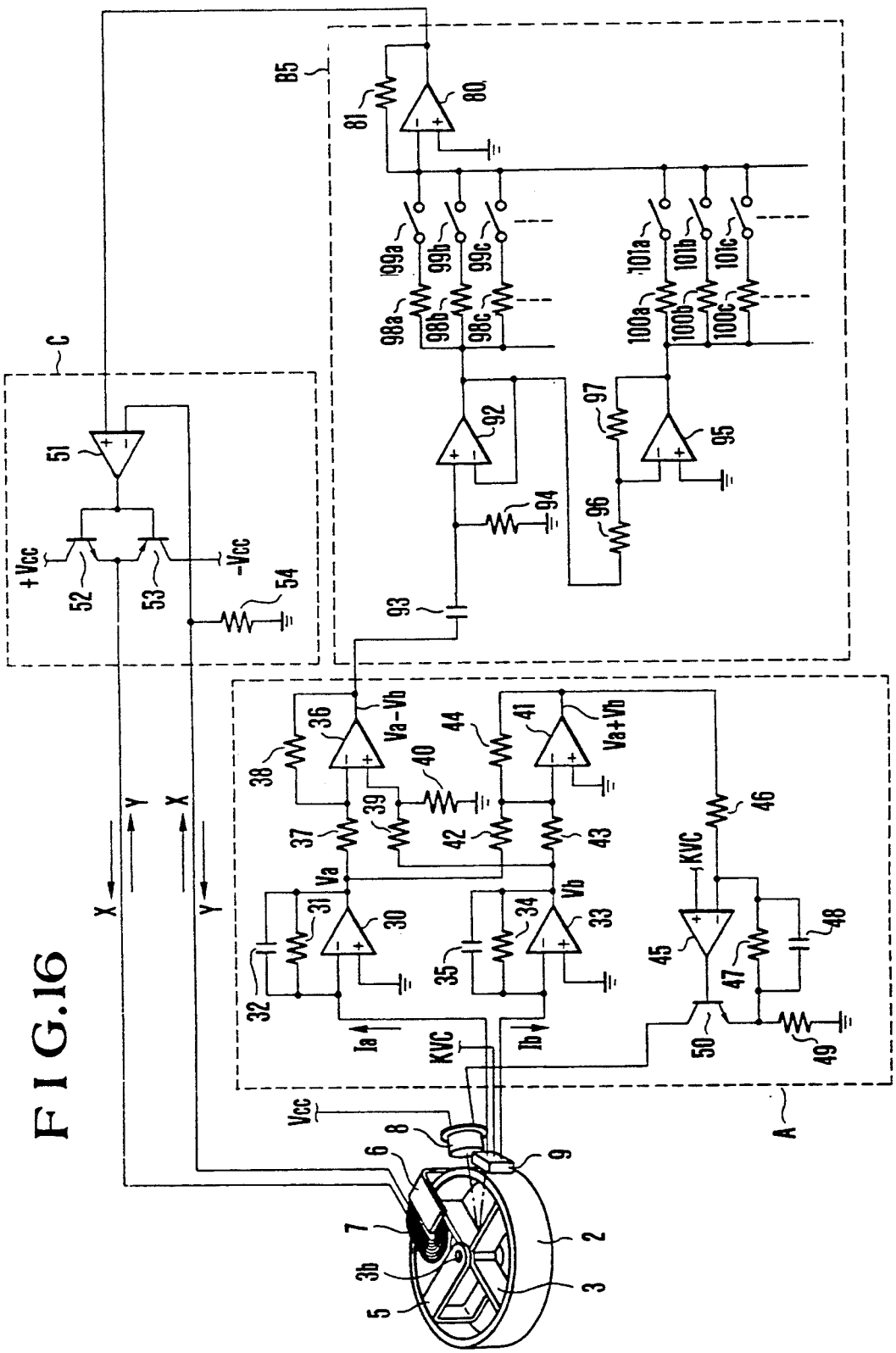
FIG. 16 is a circuit diagram showing a sixth embodiment of the electrical construction of the angular displacement detecting device according to the present invention.

FIG. 16 shows a sixth embodiment of the electrical construction of an angular displacement detecting device according to the present invention, and this electrical construction includes a plurality of viscosity constant setting means as parameters.

In such electrical construction, the position detecting circuit block A and the driver circuit block C are substantially identical to the corresponding blocks shown in FIG. 5. In FIG. 16, like reference numerals are used to denote elements which are similar to those shown in FIGS. 5 and 14, and a description thereof is omitted.

In FIG. 16, a block B5 represents a viscosity constant setting and switching circuit for setting and switching a plurality of viscosity constants in the sixth embodiment. A relative position signal (Va−Vb) indicative of the relative position between the tubular casing 2 and the floating body 3 passes through a differentiating circuit formed by an operational amplifier 92, a resistor 94 and a capacitor 983, and is then applied to the inverting input terminal of the operational amplifier 80 through a plurality of gain setting resistors 98a, 98b, 98c, . . . and a plurality of gain selecting switches 99a, 99b, 99c, . . . The output of the operational amplifier 92 is simultaneously applied to an inverting amplifier formed by an operational amplifier 95f and resistors 96 and 97. The output of the inverting amplifier is applied to the inverting input terminal of the operational amplifier 80 through a plurality of gain setting resistors 100a, 100b, 100c, . . . and a plurality of gain selecting switches 101a, 101b, 101c, . . . Since the feedback resistor 81 is connected to the operational amplifier 80, a gain is set by a selective combination of the gain setting resistors 98a, 98b, 98c, . . . in accordance with the ON/OFF state of each of the gain selecting switches 99a, 99b, 99c, . . . and 101a, 101b, 101c, . . .

Since the output of the operational amplifier 80 is provided to an input of the driver circuit block C, the wound coil 7 is supplied with a coil current which is proportional to the relative velocity between the tubular casing 2 and the floating body 3 and whose proportionality factor can be set and switched by the block B5, whereby a viscosity force works on the floating body 3 as described above.

The viscosity force set by the gain setting resistors 98a, 98b, 98c, . . . works in apparently the same direction as the original viscosity force $\eta SO(S)$, and as the number of gain selecting switches 99a, 99b, 99c, . . . to be switched on increases, a corresponding apparent viscosity force increases. As for the viscosity force set by the gain setting resistor 100a, 100b, 100c, . . . , since the relative position signal (Va−Vb) is applied in an inverted state, a corresponding apparent viscosity force decreases as the number of gain selecting switches 101a, 101b, 101c, . . . to be switched on increases. In the sixth embodiment, it is possible to freely control the strength of the viscosity force with respect to the original viscosity force by selectively switching on and off the switches.

Figure 17:
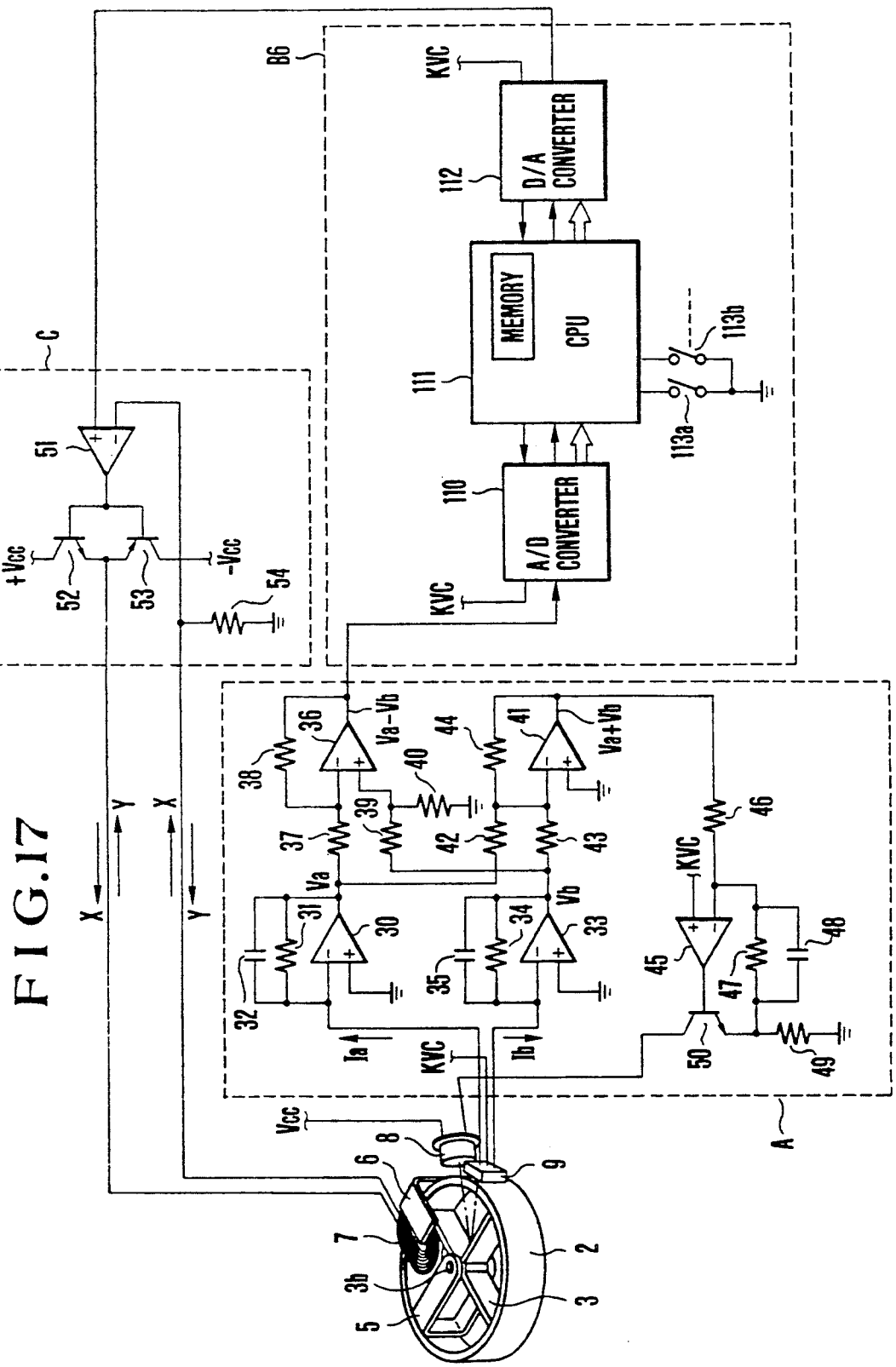
FIG. 17 is a circuit diagram showing a seventh embodiment of the electrical construction of the angular displacement detecting device according to the present invention.
Figure 18:
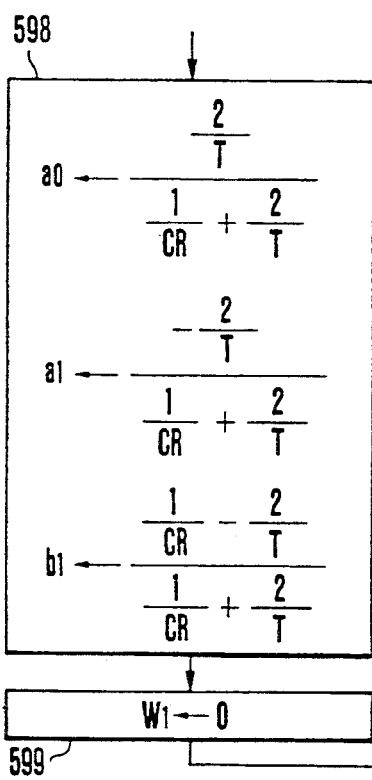
FIG. 18 is a flow chart showing the operations of the essential portions shown in FIG. 17.

FIG. 17 is a block diagram showing a seventh embodiment of the electrical construction of an angular displacement detecting device according to the present invention, in which a plurality of viscosity constants are digitally set as parameters. FIG. 18 shows a flow chart of the operation of the seventh embodiment. In such electrical construction, the position detecting circuit block A and the driver circuit block C are substantially identical to the corresponding blocks shown in FIG. 5. In FIG. 17, like reference numerals are used to denote elements which are similar to those shown in FIG. 5, and a description thereof is omitted.

In FIG. 17, a block B6 represents a control circuit for providing digital control in this embodiment. The block B6 comprises an A/D converter 110 for converting analog data into digital data, a CPU 111 for performing global arithmetic operations as well as state detection and a D/A converter 112 for outputting analog data on the basis of data supplied from the CPU 111. Parameter setting switches 113a, 113b, . . . are connected to the CPU 111.

The operation of the seventh embodiment will be described below with reference to the flow chart shown in FIG. 18.

In Step 598, constants for constituting a filter utilizing digital arithmetic operations are set. Here, the frequency characteristic H(S) of the differentiating circuit shown in FIG. 16 is expressed as:

$$H(S) = \frac{S}{S + 1/CR} \quad (7)$$

where C is the capacity of the capacitor 93 and R is the value of the resistor 94.

If this characteristic is subject to known S−Z conversion (S→2/T·(1−Z$^{-1}$)/(1+Z$^{-1}$): T is the sampling time of A/D conversion), the result is expressed in terms of a Z plane by the following difference equations:

$$H(Z) = \frac{a_0 + a_1 Z^{-1}}{1 + b_1 Z^{-1}} \quad (8)$$

$$a_0 = \frac{2/T}{1/CR + 2/T} \quad (9)$$

$$a_1 = \frac{-2/T}{1/CR + 2/T} \quad (10)$$

$$b_1 = \frac{1/CR - 2/T}{1/CR + 2/T} \quad (11)$$

If the equation (8) is developed into equations for numerical operations, the following equations are obtained:

$$W0 = e0 - b1\,W1 \quad (12)$$

$$u0 = a0\,W0 + a1\,W1 \quad (13)$$

where e0 represents the input signal obtained by the present A/D conversion, We represents the result obtained from Equation (12) on the basis of the present input signal, W1 represents the value of the last W0 (the last operation of A/D conversion), and u0 represents the present output signal obtained from Equation (13).

Accordingly, in Step 598, as expressed by Equations (9), (10) and (11), the numerical values required to perform differentiation control utilizing numerical operations are substituted into the memories a0, a1 and b1. In Step 599, the value of the memory W1 appearing in Equation (12) is reset to zero as an initial value.

In Step 600, the A/D converter 110 initiates A/D conversion of the relative position signal (Va−Vb) indicative of the relative position between the tubular casing 2 and the floating body 3 in response to an A/D control signal from the CPU 111. In Step 601, it is determined whether the A/D conversion has been completed. If the A/D conversion has been completed, the process proceeds to Step 602, where the result of the A/D conversion is transferred from the A/D converter 110 to a register A in the CPU 111. In Step 603, an initial condition for switch sensing is set so that a counter N and the value of a register X are each reset to zero.

In Step 604, it is determined whether the state of a switch N (N=0:113a, N=1: 113b, . . . ) is ON. If it is ON, the process proceeds to Step 605, where $2^N$ is added to the value of the register X. If it is OFF, the addition is omitted and the process jumps to Step 606. In Step 606, the value of the counter N is incremented by one and then, in Step 607, it is determined whether the value of the counter N has reached "K". If "K" has not yet been reached, the process returns to Step 604, where the state detection of the switch is again performed. If "K" has been reached, the state detection of the switch is completed.

Figure 19:
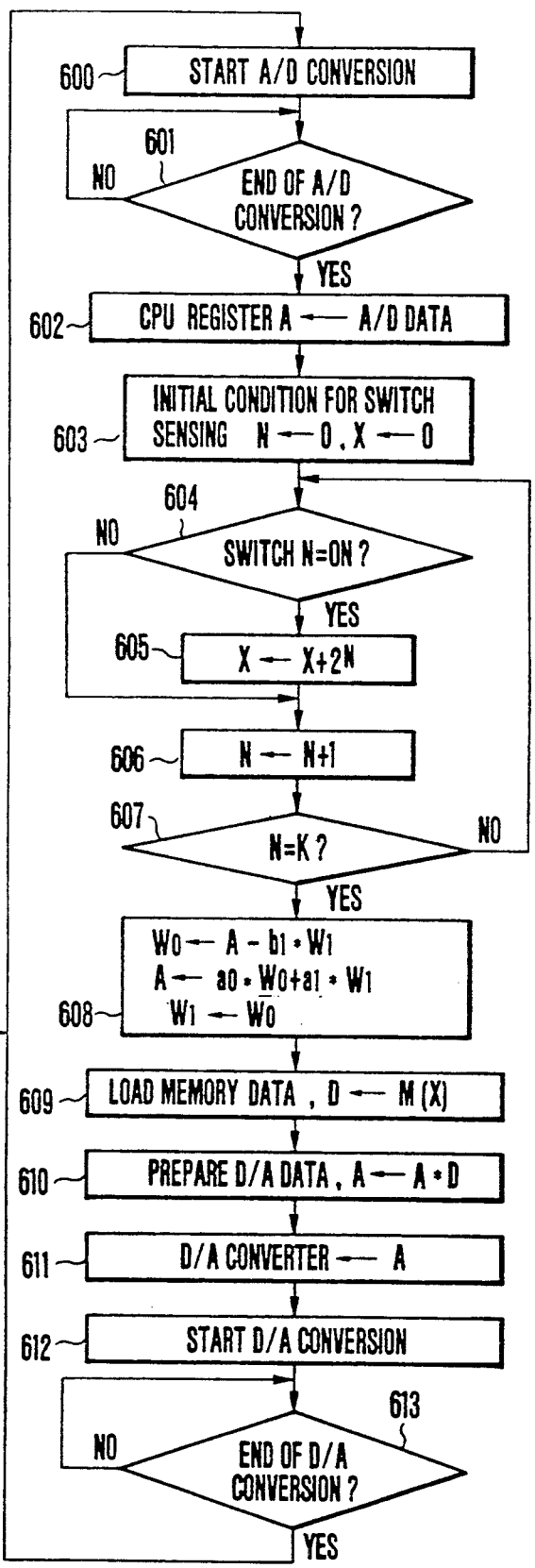
FIG. 19 is a view showing a memory data table used in the embodiment of FIG. 17.

In Steps 604 to 607, $2^K$ combinations are determined on the basis of the states of K switches. Accordingly, if corresponding data are stored on a memory table as shown in FIG. 19, it is possible to freely select a parameter according to the states of the switches.

In Step 608, operations on Equations (12) and (13) are performed. The value obtained by multiplying the value of the memory b1 by the value of the memory W1 is subtracted from the value of a register A in which the value obtained from the A/D conversion of the relative position signal (Va −Vb) is stored, and the result is stored in the memory W0. Then, the value obtained by multiplying the value of the memory a0 by the value of the memory W0 is added to the value obtained by multiplying the value of the memory a1 by the value of the memory W1, and the result is set in the register A. The value of the memory W0 is stored in the memory W1.

Since the numerical value corresponding to the state of the switch is substituted in the register X as described above, data M(X) having an address corresponding to such numerical value is, in Step 609, set in a register D in the CPU 111. In Step 610, the value of the register A is multiplied by the value of the register D and the result is set in the register A. In Step 611, the value of the register A is transferred to the D/A converter 112. In Step 612, D/A conversion is initiated and, in Step 613, it is determined whether the D/A conversion has been completed. If the D/A conversion is completed, the process returns to Step 600.

Since the output of the D/A converter 112 is connected to an input port of the driver circuit block C, an electrical current proportional to the output of the D/A converter 112 is supplied to the wound coil 7. Accordingly, in the seventh embodiment, it is possible to vary a proportionality factor, i.e., a viscosity force, on the basis of the states of the parameter setting switches 113a, 113b, ...

Figure 20:
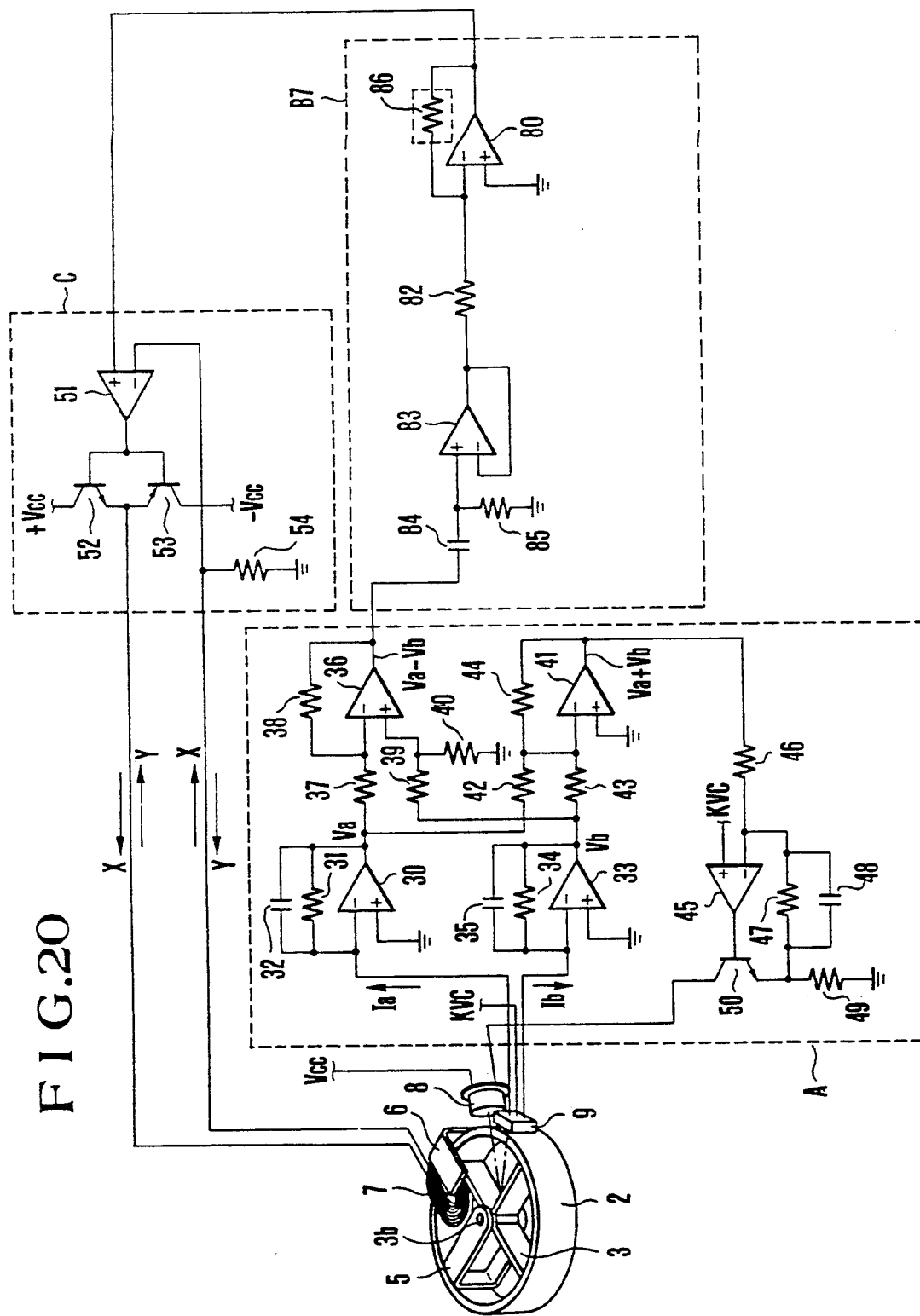
FIG. 20 is a circuit diagram showing an eighth embodiment of the electrical construction of the angular displacement detecting device according to the present invention.

FIG. 20 shows an eighth embodiment of the electrical construction of an angular displacement detecting device according to the present invention.

In this electrical construction, the position detecting circuit block A and the driver circuit block C are substantially identical to the corresponding blocks shown in FIG. 5. In FIG. 20, a block B7 represents an arithmetic circuit for determining sensor parameters in the eighth embodiment. The construction of FIG. 20 differs from that of FIG. 14 in that a feedback resistor 86 is a thermo-sensitive resistor having a positive temperature coefficient. More specifically, the provision of the feedback resistor 86 consisting of a thermo-sensitive resistor having a positive temperature coefficient makes it possible to increase circuit gain with an increase of temperature and to decrease it with a decrease of temperature.

In this manner, a viscosity force can be electrically controlled. Accordingly, even if the viscosity of liquid varies with temperature changes, it is possible to maintain constant frequency characteristics by varying the gain of coil energization in accordance with the temperature changes.

In FIG. 20, like reference numerals are used to denote elements which are similar to those shown in FIG. 5, and a description thereof is omitted.

Figure 21:
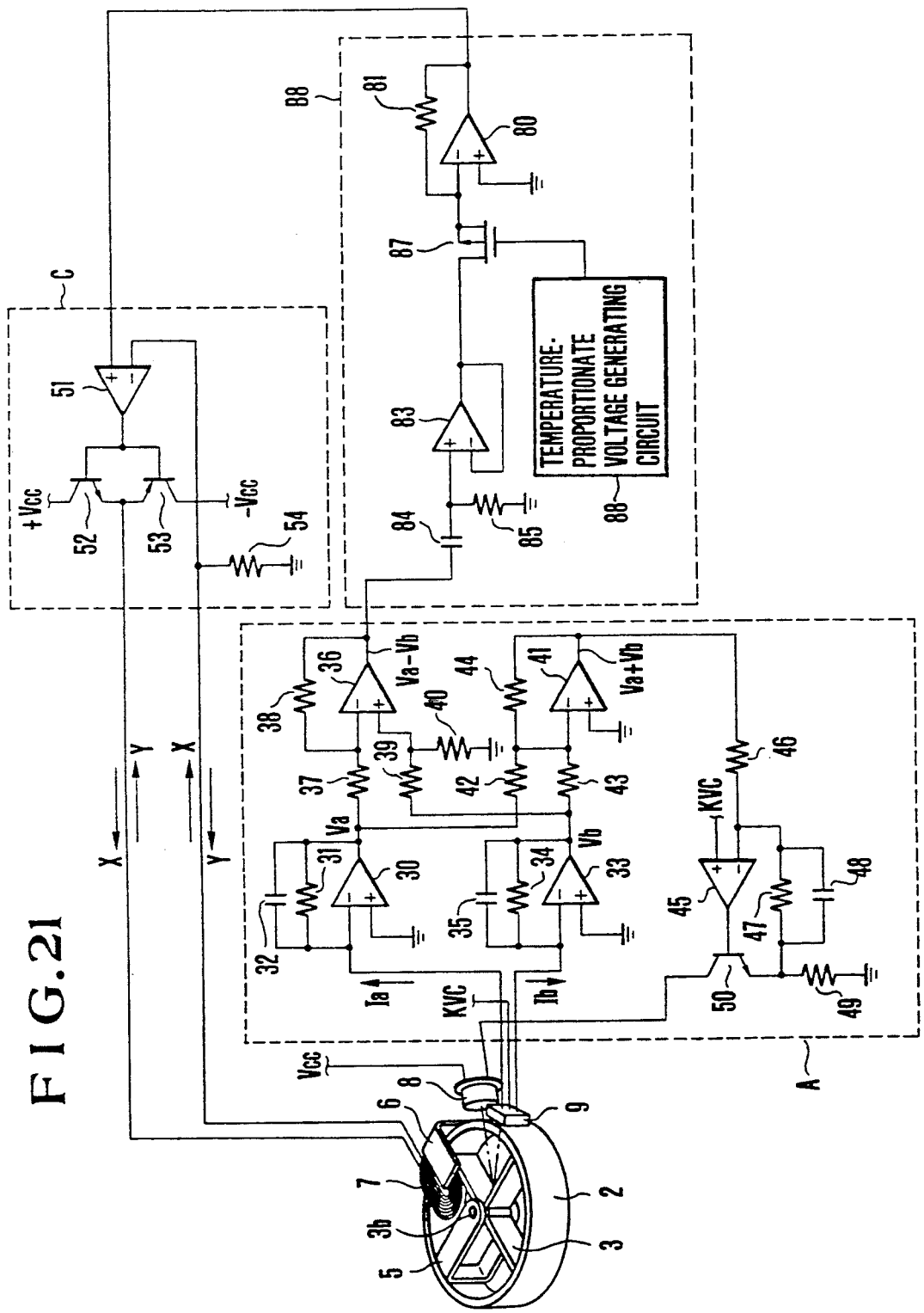
FIG. 21 is a circuit diagram showing a ninth embodiment of the electrical construction of the angular displacement detecting device according to the present invention.

FIG. 21 shows a ninth embodiment of the electrical construction of an angular displacement detecting device according to the present invention.

In this electrical construction, the position detecting circuit block A and the driver circuit block C are substantially identical to the corresponding blocks shown in FIG. 5. In FIG. 21, a block B8 represents an arithmetic circuit for determining sensor parameters in the ninth embodiment. The construction of FIG. 21 differs from that of FIG. 14 in that the gain setting resistor 82 of the fifth embodiment is replaced with a gain setting MOS resistor 87 and the output of a temperature-proportionate voltage generating circuit 88 is coupled to the gate input of the MOS resistor 87.

In FIG. 21, like reference numerals are used to denote elements which are similar to those shown in FIG. 14, and a description thereof is omitted.

The output of the temperature-proportionate voltage generating circuit 88 has a positive temperature coefficient, i.e., the output increases with an increase of temperature and decreases with a decrease of temperature. Since the ON resistance of the MOS resistor 87 to which the output is coupled varies approximately logarithmically with respect to a voltage applied to its gate, the coil viscosity force $\eta SO(S)$ can be varied approximately logarithmically with respect to temperature changes. Accordingly, if the viscosity force of liquid greatly increases under a low-temperature condition, it is possible to keep the entire viscosity force approximately constant irrespective of temperature by applying the above-described viscosity force produced by coil energization.

Figure 22:
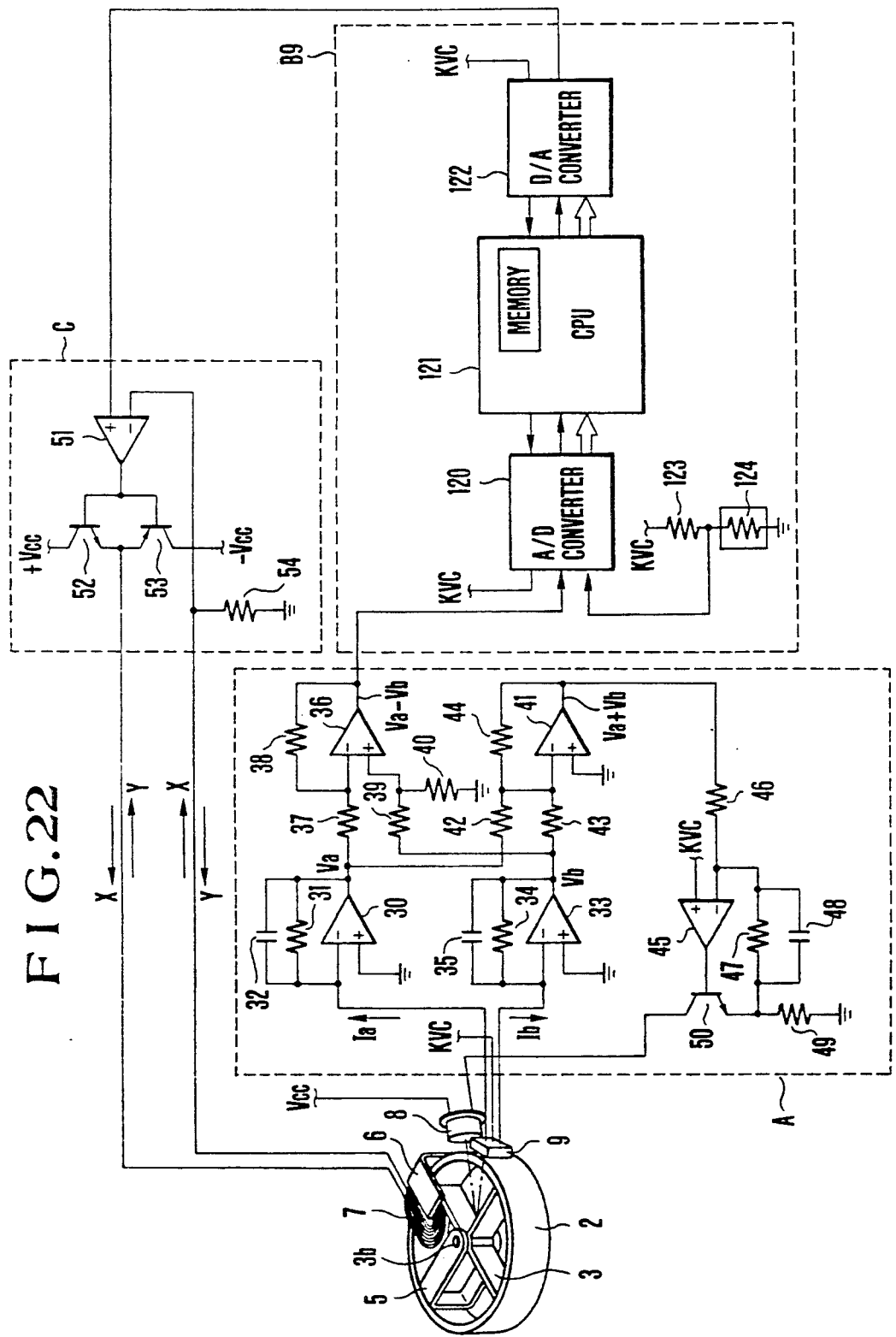
FIG. 22 is a circuit diagram showing a tenth embodiment of the electrical construction of the angular displacement detecting device according to the present invention.
Figures 23, 24:
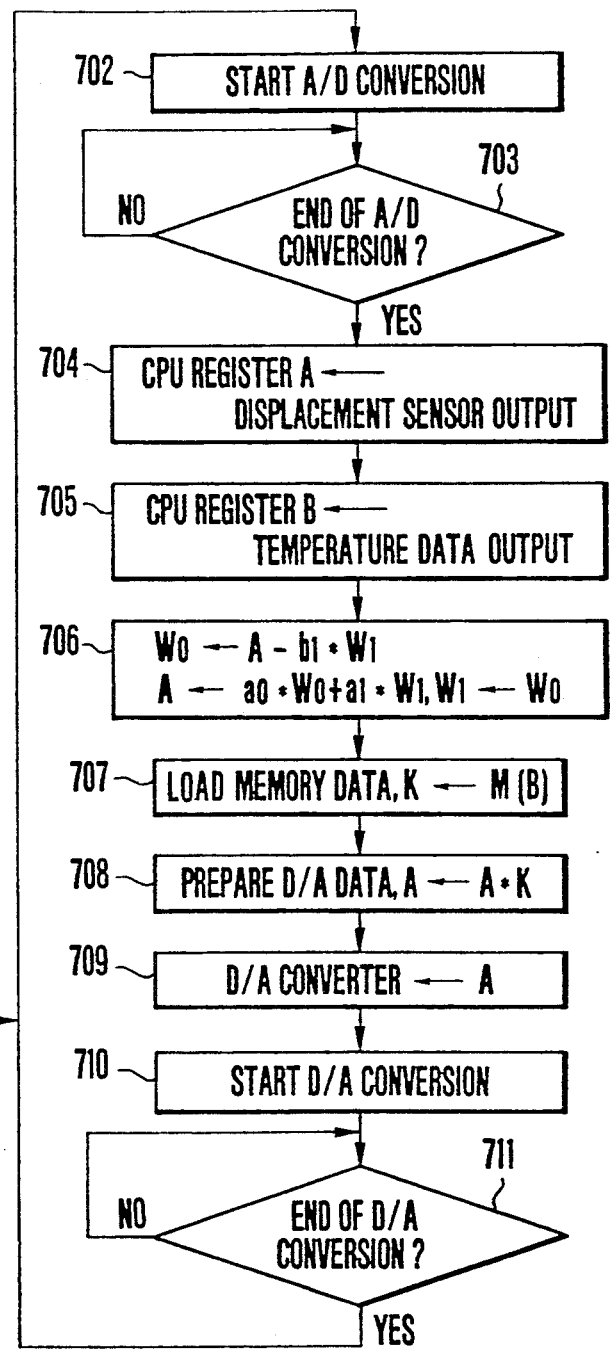
FIG. 23 is a flow chart showing the operations of the essential portions shown in FIG. 22.
FIG. 24 is a view showing a memory data table used in the embodiment of FIG. 22.

FIG. 22 is a block diagram showing a tenth embodiment of the electrical construction of an angular displacement detecting device according to the present invention, in which the viscosity force produced by coil energization is digitally varied with temperature. FIG. 23 shows a flow chart of the operation of the tenth embodiment. In such electrical construction, the position detecting circuit block A and the driver circuit block C are substantially identical to the corresponding blocks shown in FIG. 5. In FIG. 22, like reference numerals are used to denote elements which are similar to those shown in FIG. 5, and a description thereof is omitted.

In FIG. 22, a block B9 represents a unit for digitally setting a gain. The block B9 comprises an A/D converter 120 for converting a relative displacement signal (Va−Vb) supplied from the position detecting circuit block A into digital data, a CPU 121 for performing global arithmetic operations as well as state detection, a D/A converter 122 for outputting analog data for driving the driver circuit on the basis of data from the CPU 121, and thermo-sensitive resistors 124 and 123 for detecting temperature.

The operation of the tenth embodiment will be described below with reference to the flow chart shown in FIG. 23.

In Step 700, the coefficients required to digitally differentiate the relative displacement signal (Va −Vb) are set, where T represents the period of sampling time for performing A/D conversion, C represents the capacitance of the capacitor 84 of FIG. 14, and R represents the resistance of the resistor 85. In Step 701, the value of a register W1 which is used for arithmetic operations is reset to zero. In Step 702, the A/D converter 120 initiates A/D conversion of the relative displacement signal (Va−Vb) indicative of the relative displacement between the tubular casing 2 and the floating body 3 as well as a voltage level provided by the thermo-sensitive resistor 124, in response to an A/D control signal from the CPU 121. In Step 703, it is determined whether the A/D conversion has been completed. If the A/D conversion has been completed, the process proceeds to Step 704, where the result of the A/D conversion of the relative displacement signal (Va−Vb) is transferred from the A/D converter 120 to a register A in the CPU 121. Then, in Step 705, an output indicative of temperature data is transferred from the A/D converter 120 to a register B in the CPU 121. In Step 706, differentiating operations are performed with respect to a time axis according to known S-Z conversion, and the result is set in the register A. In Step 707, a predetermined value is transferred to a register K from the memory data table 720 shown in FIG. 24 in accordance with the value of the register B in which the temperature data is stored, whereby gain data corresponding to the temperature data is set. In Step 708, as data to be transferred to the D/A converter 122, the value obtained by multiplying the values of the registers A and K is set in the register A. In Step 709, the value of the register A is transferred to the D/A converter 122. In Step 710, the D/A converter 122 initiates its operation in response to a control signal supplied from the CPU 121. In Step 711, if the end of the D/A conversion is detected, the process returns to Step 702, where the above-described operation is repeated.

Since the output of the D/A converter 122 is coupled to an input port of the driver circuit block C, an electric current proportional to the output of the D/A converter 122 is supplied to the wound coil 7. Accordingly, in the tenth embodiment, if the data required to set the gain of coil energization with respect to temperature is stored in advance, it is possible to keep constant the overall frequency characteristics by utilizing a viscosity force derived from the coil energization even if the viscosity of the liquid varies.

Figure 25:
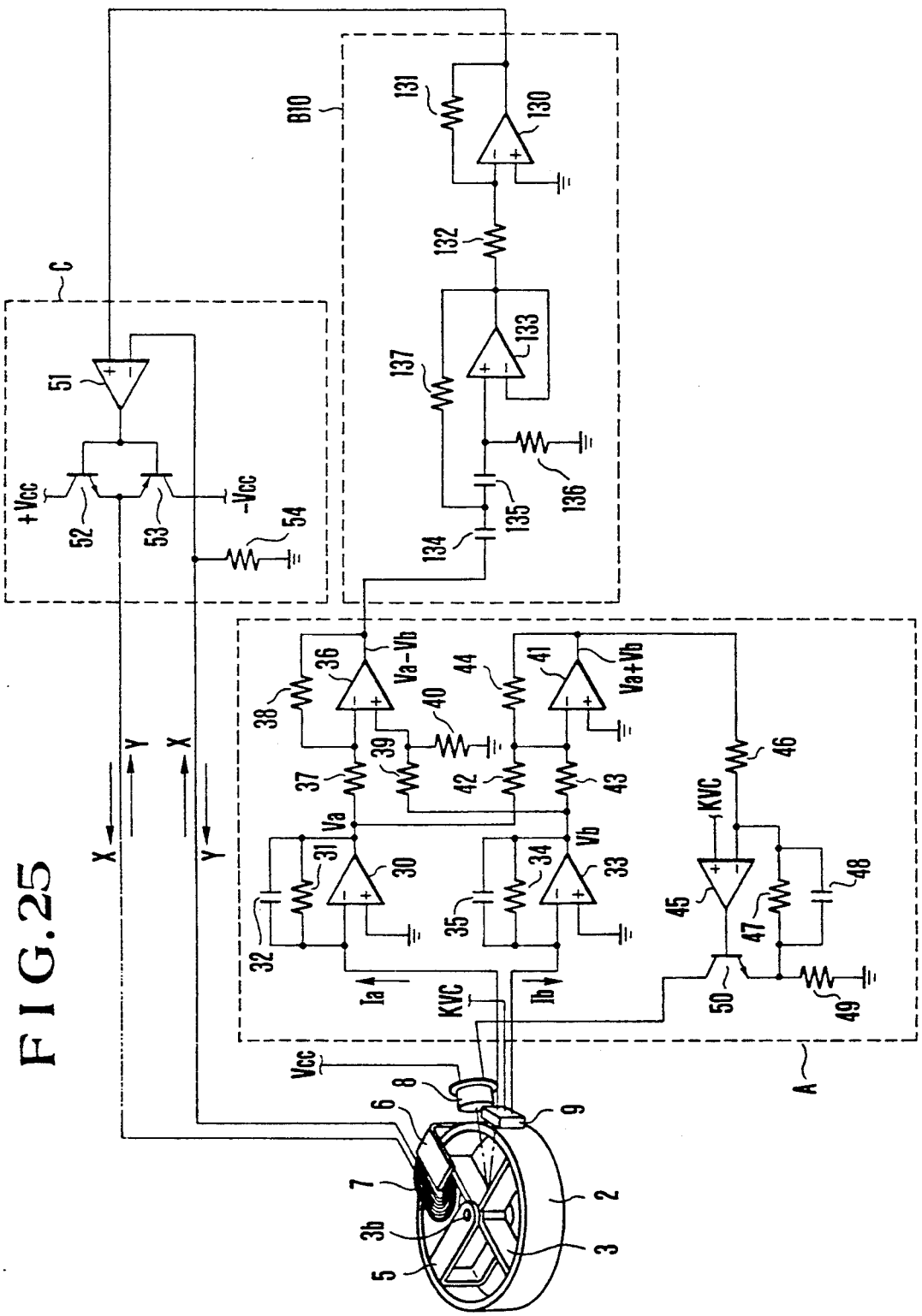
FIG. 25 is a circuit diagram showing an eleventh embodiment of the electrical construction of the angular displacement detecting device according to the present invention.

FIG. 25 shows an eleventh embodiment of the electrical construction of an angular displacement detecting device according to the present invention.

In such electrical construction, the position detecting circuit block A and the driver circuit block C are substantially identical to the corresponding blocks shown in FIG. 5. In FIG. 25, like reference numerals are used to denote elements which are similar to those shown in FIG. 5, and a description thereof is omitted.

The block B10 of FIG. 25 indicates an arithmetic circuit for determining sensor parameters in the eleventh embodiment.

A difference signal (Va−Vb) which is the output from the operational amplifier 36 is coupled to the noninverting input terminal of an operational amplifier 133 through capacitors 134 and 135. A circuit formed by the operational amplifier 133, the capacitors 134, 135 and the resistor 136 operates as a second-order differentiating circuit with respect to a frequency which is sufficiently lower than the frequency determined by a capacitance C (the capacitance of each of the capacitors 134 and 135) and a resistance R, i.e., $f = \frac{1}{2\pi CR}$. The output of the operational amplifier 133 is coupled to the inverting input terminal of an operational amplifier 130 through a gain setting resistor 132, and a feedback resistor 131 is connected to the operational amplifier 130. Accordingly, the output of the operational amplifier 133 is amplified to a value proportional to the second-order differential value of the difference signal (Va−Vb) in accordance with the value of the gain setting resistor 132, whereby the parameters for the entire device are set.

According to the above-described circuit arrangement, by supplying the wound coil 7 with an electric current proportional to the second-order differential value of a difference signal indicative of the relative position between the tubular casing 2 and the floating body 3, that is, the relative position signal (Va−Vb), a force according to Fleming's left-hand rule is, as described above, generated in the closed magnetic path formed by the floating body 3 and the yoke 6. Since such force is naturally proportional to the current value of the wound coil 7, a force proportional to the relative acceleration between the tubular casing 2 and the floating body 3 is generated.

Figure 26:
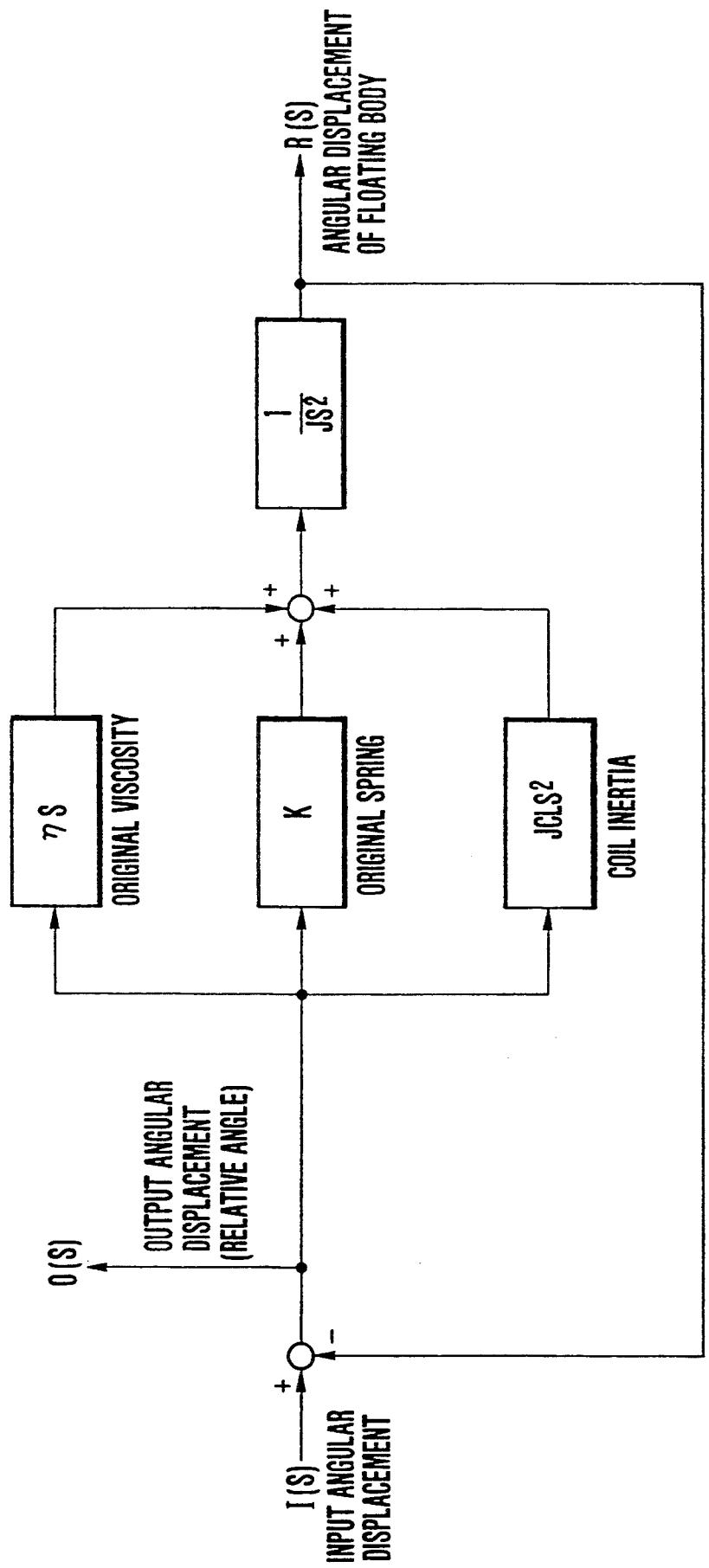
FIG. 26 is a schematic block diagram which serves to illustrate the circuit characteristics of the electrical construction of FIG. 25.

The characteristics of the angular displacement detecting device according to the eleventh embodiment will now be described with reference to the frequency transfer characteristic shown in FIG. 26.

An input I(S) indicates the displacement of the tubular casing 2 with respect to absolute space. An output angular displacement O(S), which is detected by the device according to the eleventh embodiment, is detected on the basis of the relative relationship between the input angular displacement I(S) and the displacement R(S) of the floating body 3 with respect to the absolute space. Therefore, the output angular displacement O(S) is represented by the following equation:

$$O(S) = I(S) - R(S) \tag{14}$$

The output angular displacement O(S) is the relative angular displacement between the tubular casing 2 and the floating body 3, and a viscosity force $\eta SO(S)$ which is proportional to the relative velocity between the tubular casing 2 and the floating body 3 is produced by the liquid 4 sealed in the tubular casing 2, as described in connection with the conventional example. In theory, if the width of the yoke 6 is infinitely large with respect to the direction of movement of the floating body 3, no force based on magnetic force occurs while the wound coil 7 is not being energized. However, in practice, since the width of the yoke 6 is finite, a spring force $KO(S)$ also works as a weak force. Further, in the eleventh embodiment, it is possible to apply a new inertia force by generating a force by supplying the wound coil 7 with an electric current proportional to the second-order differential value of the relative displacement between the tubular casing 2 and the floating body 3 by means of the above-described method. In the eleventh embodiment, an inertia force $JCLS^2O(S)$, which is derived from the energization of the coil, can be set to an arbitrary value on the basis of the value of the gain setting resistor 132.

On the assumption that the above-described forces work on the floating body 3, if the moment of inertia J of the liquid 4 sealed in the tubular casing 3 is used to express the angular displacement R(S) of the floating body 3 with respect to absolute space, the following equation is obtained:

$$R(S) = \frac{1}{JS^2} \cdot (K + \eta S + JCLS^2)O(S) \tag{15}$$

If the transfer characteristic of the eleventh embodiment is expressed by using Equations (14) and (15), the following equation is obtained:

$$\frac{O(S)}{I(S)} = \frac{JS^2}{(J + JCL)S^2 + \eta S + K} \tag{16}$$

Equation (16) represents the characteristic of a high-pass filter of second order, and it is apparent that its frequency characteristic is determined by the inertia force produced by the wound coil 7.

Figure 27:
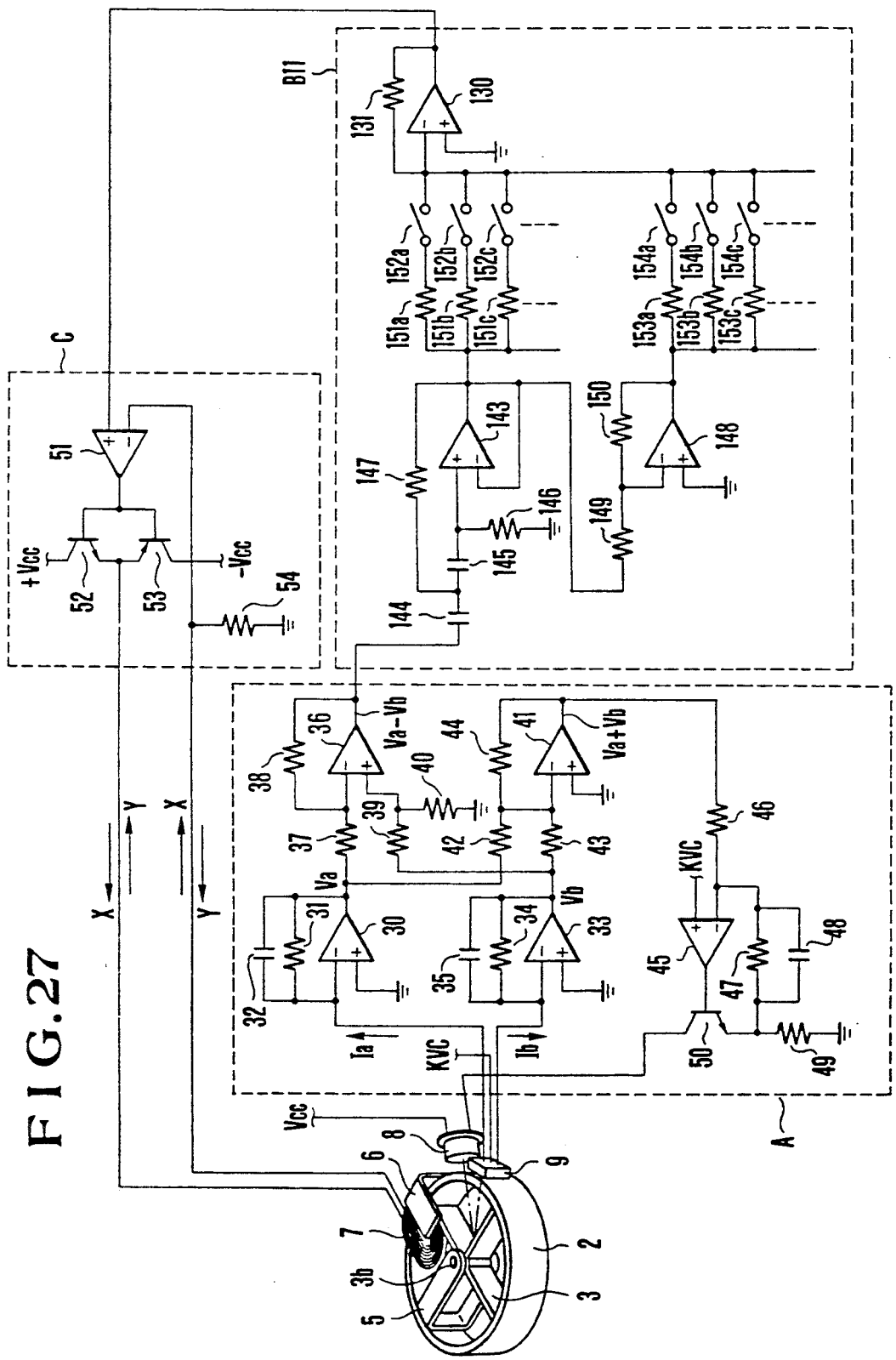
FIG. 27 is a circuit diagram showing a twelfth embodiment of the electrical construction of the angular displacement detecting device according to the present invention.

FIG. 27 shows a twelfth embodiment of the electrical construction of an angular displacement detecting device according to the present invention, and this electrical construction includes a plurality of inertia constant setting means.

In such electrical construction, the position detecting circuit block A and the driver circuit block C are substantially identical to the corresponding blocks shown in FIG. 5. In FIG. 27, like reference numerals are used to denote elements which are similar to those shown in FIGS. 5 and 25, and a description thereof is omitted.

In FIG. 27, a block B11 represents an inertia constant setting and switching circuit for setting and switching a plurality of inertia constants in the twelfth embodiment. A relative position signal (Va−Vb) indicative of the relative position between the tubular casing 2 and the floating body 3 passes through a second-order differentiating circuit formed by an operational amplifier 143, capacitors 144, 145 and resistors 146, 147, operational amplifier 130 through a plurality of gain setting resistors 151a, 151b, 151c, . . . and a plurality of gain selecting switches 152a, 152b, 152c, . . . The output of the operational amplifier 143 is simultaneously applied to an inverting amplifier formed by an operational amplifier 148 and resistors 149 and 150. The output of the inverting amplifier is applied to the inverting input terminal of the operational amplifier 130 through a plurality of gain setting resistors 153a, 153b, 153c, . . . and a plurality of gain selecting switches 154a, 154b, 154c, . . . Since the feedback resistor 131 is connected to the operational amplifier 130, a gain is set by a selective combination of the gain setting resistors 151a, 151b, 151c, . . . and 153a, 153b, 153c, . . . in accordance with the ON/OFF state of each of the gain selecting switches 152a, 152b, 152c, . . . and 154a, 154b, 154c, . . .

Since the output of the operational amplifier 130 is provided to an input of the driver circuit block C, the wound coil 7 is supplied with a coil current which is proportional to the relative acceleration between the tubular casing 2 and the floating body 3 and whose proportionality factor can be set and switched by the block B11, whereby an inertia force works on the floating body 3 as described above.

The inertia force set by the gain setting resistors 151a, 151b, 151c, . . . apparently works in the direction in which it is added to the original inertia force, and as the number of gain selecting switches 152a, 152b, 152c, . . . to be switched on increases, a corresponding apparent inertia force increases. As for the inertia force set by the gain setting resistors 153a, 153b, 153c, . . . , since the relative position signal (Va−Vb) is applied in an inverted state, a corresponding apparent inertia force decreases as the number of gain selecting switches 154a, 154b, 154c, . . . to be switched on increases. In the twelfth embodiment, it is possible to apparently freely control the strength of the inertia force with respect to the original inertia force by selectively switching on and off the switches.

Figure 28:
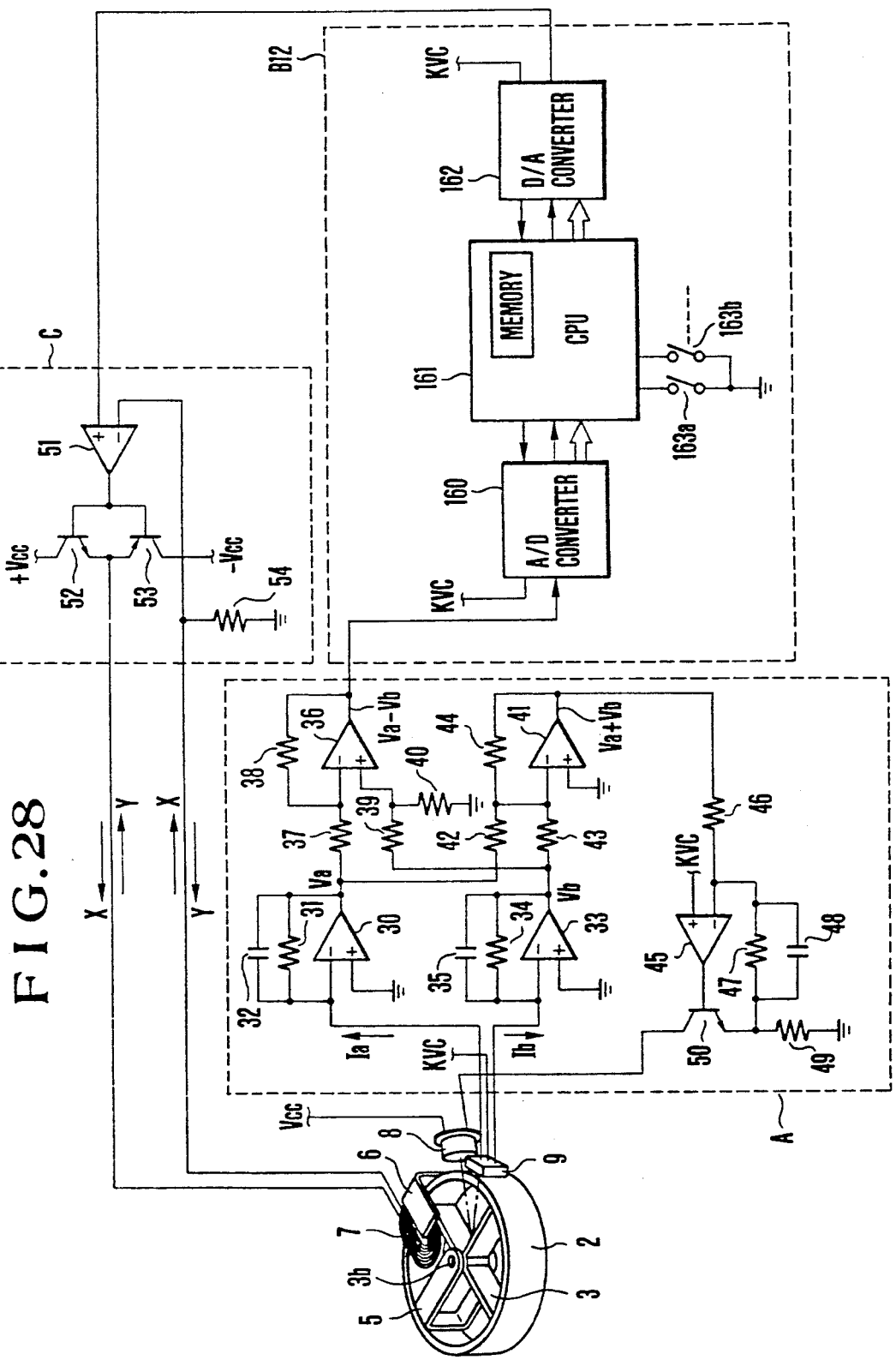
FIG. 28 is a circuit diagram showing a thirteenth embodiment of the electrical construction of the angular displacement detecting device according to the present invention.
Figure 29:
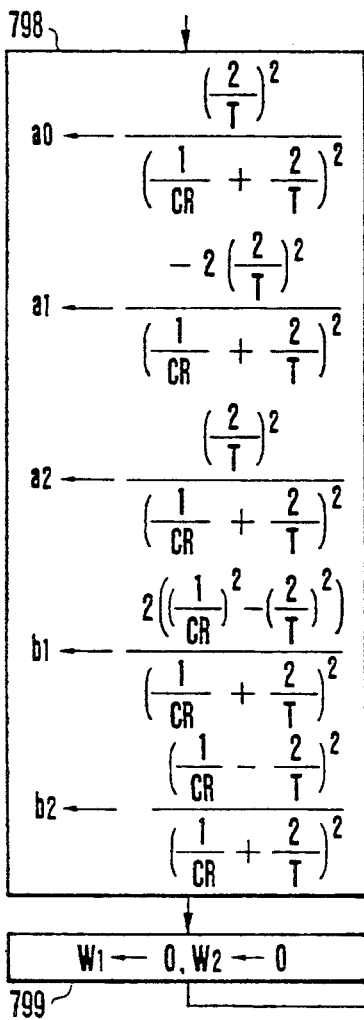
FIG. 29 is a flow chart showing the operations of the essential portions shown in FIG. 28.

FIG. 28 is a block diagram showing a thirteenth embodiment of the electrical construction of an angular displacement detecting device according to the present invention, in which a plurality of inertia forces are digitally set. FIG. 29 shows a flow chart of the operation of the thirteenth embodiment. In such electrical construction, the position detecting circuit block A and the driver circuit block C are substantially identical to the corresponding blocks shown in FIG. 5. In FIG. 28, like reference numerals are used to denote elements which are similar to those shown in FIG. 5, and a description thereof is omitted.

In FIG. 28, a block B12 represents a control circuit for providing digital control in this embodiment. The block B12 comprises an A/D converter 160 for converting analog data into digital data, a CPU 161 for performing global arithmetic operations as well as state detection and a D/A converter 162 for outputting analog data on the basis of data supplied from the CPU 161. Parameter setting switches 163a, 163b, . . . are connected to the CPU 161.

The operation of the thirteenth embodiment will be described below with reference to the flow chart shown in FIG. 29.

In Step 798, constants for constituting a filter utilizing digital arithmetic operations are set. Here, the frequency characteristic H(S) of the second-order differentiating circuit shown in FIG. 25 is expressed as:

$$H(S) = \frac{S^2}{S^2 + 2/CR \cdot S + (1/CR)^2} \quad (17)$$

where C is the capacitance of the capacitors 134, 135 and R is the value of the resistors 136, 137.

If this characteristic is subject to known S-Z conversion (S→2/T·(1−Z$^{-1}$)/(1+Z$^{-1}$): T is the sampling time of A/D conversion), the result is expressed in terms of a Z plane by the following difference equations:

$$H(Z) = \frac{a_0 + a_1 Z^{-1} + a_2 Z^{-2}}{1 + b_1 Z^{-1} + b_2 Z^{-2}} \quad (18)$$

$$a_0 = \frac{(2/T)^2}{(1/CR + 2/T)^2} \quad (19)$$

$$a_1 = \frac{-2(2/T)^2}{(1/CR + 2/T)^2} \quad (20)$$

$$a_2 = \frac{(2/T)^2}{(1/CR + 2/T)^2} \quad (21)$$

$$b_1 = \frac{2((1/CR)^2 - (2/T)^2)}{(1/CR + 2/T)^2} \quad (22)$$

$$b_2 = \frac{(1/CR - 2/T)^2}{(1/CR + 2/T)^2} \quad (23)$$

If the equation (18) is developed into equations for numerical operations, the following equations are obtained:

$$W0 = e0 - b1 W1 - b2 W2 \quad (24)$$

$$u0 = a0 W0 + a1 W1 + a2 W2 \quad (25)$$

where e0 represents the input signal obtained by the present A/D conversion, W0 represents the result obtained from Equation (24) on the basis of the present input signal, W1 represents the value of the last W0 (the last operation of A/D conversion), W2 represents the value of the last W0 but one (the last operation but one of A/D conversion), and u0 represents the present output signal obtained from Equation (25).

Accordingly, in Step 798, as expressed by Equations (19), (20), (21), (22) and (23), the numerical values required to perform second-order differentiation control utilizing numerical operations are substituted into the memories a0 a1, a2, b1 and b2. In Step 799, the values of the memories W1 and W2 appearing in Equation (22) are each reset to zero as an initial value.

In Step 800, the A/D converter 160 initiates A/D conversion of the relative position signal (Va−Vb) indicative of the relative position between the tubular casing 2 and the floating body 3 in response to an A/D control signal from the CPU 161. In Step 801, it is determined whether the A/D conversion has been completed. If the A/D conversion has been completed, the process proceeds to Step 802, where the result of the A/D conversion is transferred from the A/D converter 160 to a register A in the CPU 161. In Step 803, an initial condition for switch sensing is set so that a counter N and the value of a register X are each reset to zero.

In Step 804, it is determined whether the state of a switch N (N=0: 163a, N=1: 163b, ...) is ON. If it is ON, the process proceeds to Step 805, where $2^N$ is added to the value of the register X. If it is OFF, the addition is omitted and the process jumps to Step 806. In Step 806, the value of the counter N is incremented by one and then, in Step 807, it is determined whether the value of the counter N has reached "K". If "K" has not yet been reached, the process returns to Step 804, where the state detection of the switch is again performed. If "K" has been reached, the state detection of the switch is completed.

Figure 30:
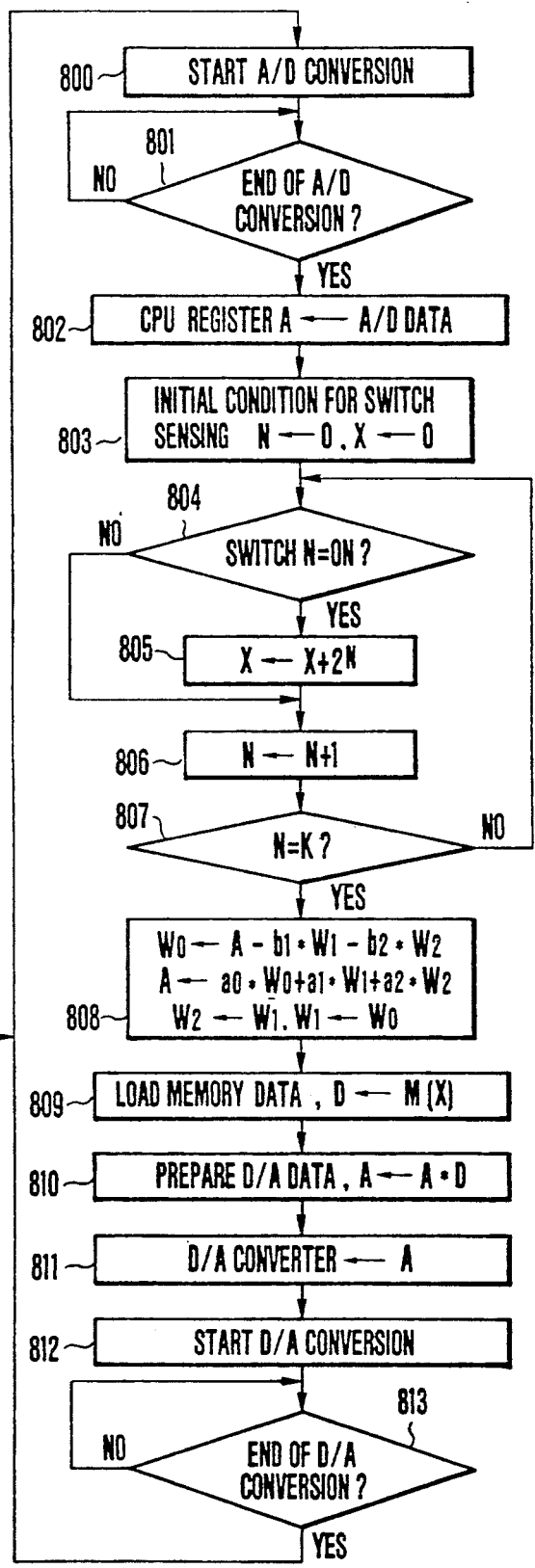
FIG. 30 is a view showing a memory data table used in the embodiment of FIG. 28.

In Steps 804 to 807, $2^K$ combinations are determined on the basis of the states of K switches. Accordingly, if corresponding data are stored on a memory table as shown in FIG. 30, it is possible to freely select a parameter according to the states of the switches.

In Step 808, operations on Equations (22) and (23) are performed. The value obtained by multiplying the value of the memory b1 by the value of the memory W1 and the value obtained by multiplying the value of the memory b2 by the value of the memory W2 are subtracted from the value of a register A in which the value obtained from the A/D conversion of the relative position signal (Va−Vb) is stored, and the result is stored in the memory W0. Then, the value obtained by multiplying the value of the memory a0 by the value of the memory W0 is added to the value obtained by multiplying the value of the memory a1 by the value of the memory W1 and the value obtained by multiplying the value of the memory a2 by the value of the memory W2, and the result is set in the register A. Further, the values of the memories W1 and W0 are stored in the memories W2 and W1, respectively.

Since the numerical value corresponding to the state of the switch is substituted in the register X as described above, data M(X) having an address corresponding to such numerical value is, in Step 809, set in a register D in the CPU 161. In Step 810, the value of the register A is multiplied by the value of the register D and the result is set in the register A. In Step 811, the value of the register A is transferred to the D/A converter 162. In Step 812, D/A conversion is initiated and, in Step 813, it is determined whether the D/A conversion has been completed. If the D/A conversion is completed, the process returns to Step 800.

Since the output of the D/A converter 162 is connected to an input port of the driver circuit block C, an electrical current proportional to the output of the D/A converter 162 is supplied to the wound coil 7. Accordingly, in the thirteenth embodiment, it is possible to vary a proportionality factor, i.e., an inertia force, on the basis of the states of the parameter setting switches 163a, 163b, ...

Figure 31:
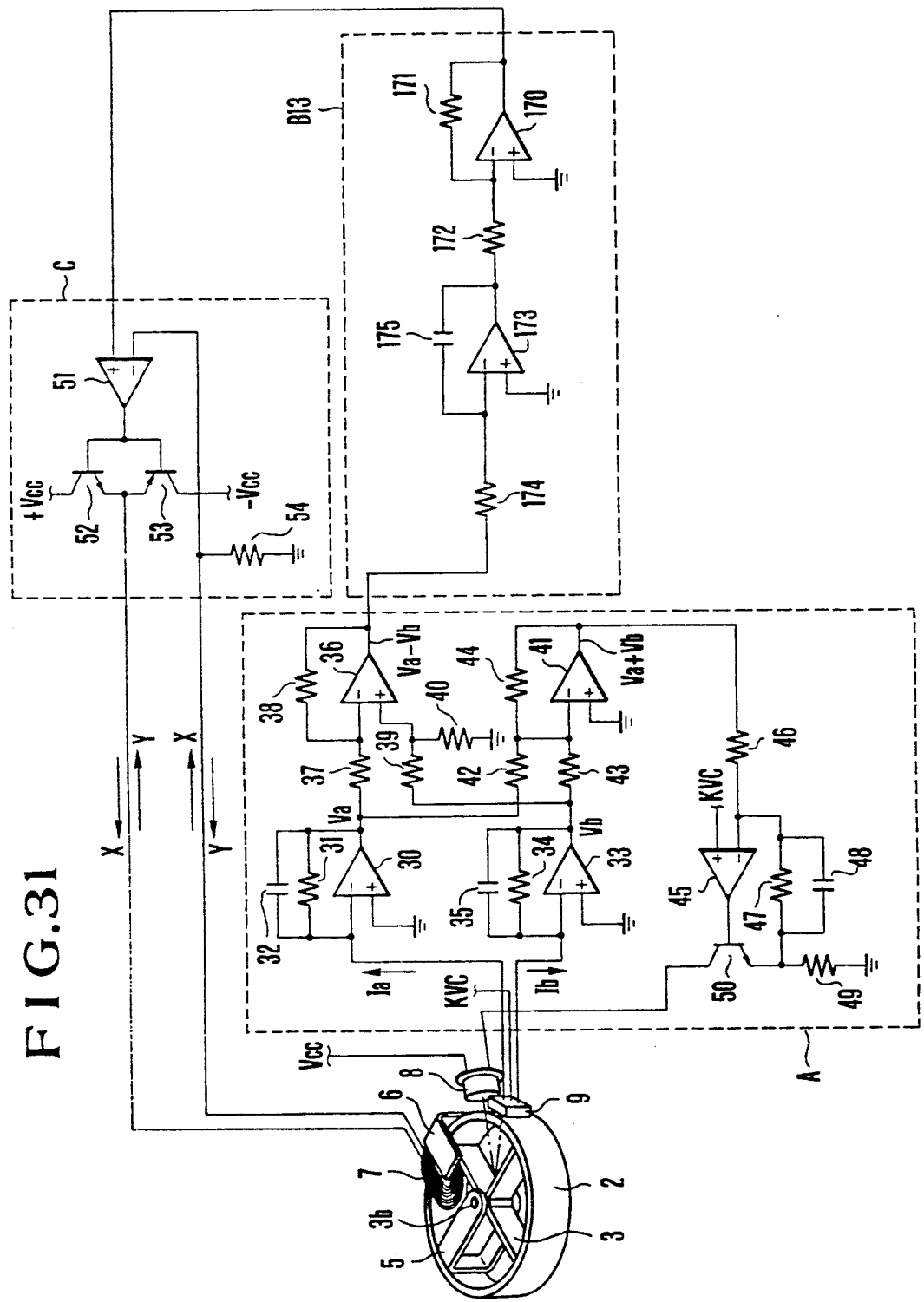
FIG. 31 is a circuit diagram showing a fourteenth embodiment of the electrical construction of the angular displacement detecting device according to the present invention.

FIG. 31 shows a fourteenth embodiment of the electrical construction of an angular displacement detecting device according to the present invention.

In this electrical construction, the position detecting circuit block A and the driver circuit block C are substantially identical to the corresponding blocks shown in FIG. 5. In FIG. 31, like reference numerals are used to denote elements which are similar to those shown in FIG. 5, and a description thereof is omitted.

In FIG. 31, a block B13 represents an arithmetic circuit for determining sensor parameters in the fourteenth embodiment.

A relative position signal (Va−Vb) which is an output from the operational amplifier 36 is applied to an integrating circuit formed by an operational amplifier 173, a resistor 174 and the capacitor 175. The output of the operational amplifier 173 is coupled to the inverting input terminal of an operational amplifier 170 through a gain setting resistor 172, and a feedback resistor 171 is connected to the operational amplifier 170. Accordingly, the output of the operational amplifier 173 is amplified to a value proportional to the integral value of the difference signal (Va−Vb) in accordance with the value of the gain setting resistor 172, whereby the parameters for the entire device are set.

According to the above-described circuit arrangement, by supplying the wound coil 7 with an electric current proportional to the integral value of a difference signal indicative of the relative position between the tubular casing 2 and the floating body 3, that is, the relative position signal (Va−Vb), a force according to Fleming's left-hand rule is, as described above, generated in the closed magnetic path formed by the floating body 3 and the yoke 6. Since such force is naturally proportional to the current value of the wound coil 7, a force proportional to the integral value of the relative displacement between the tubular casing 2 and the floating body 3 is generated.

Figure 32:
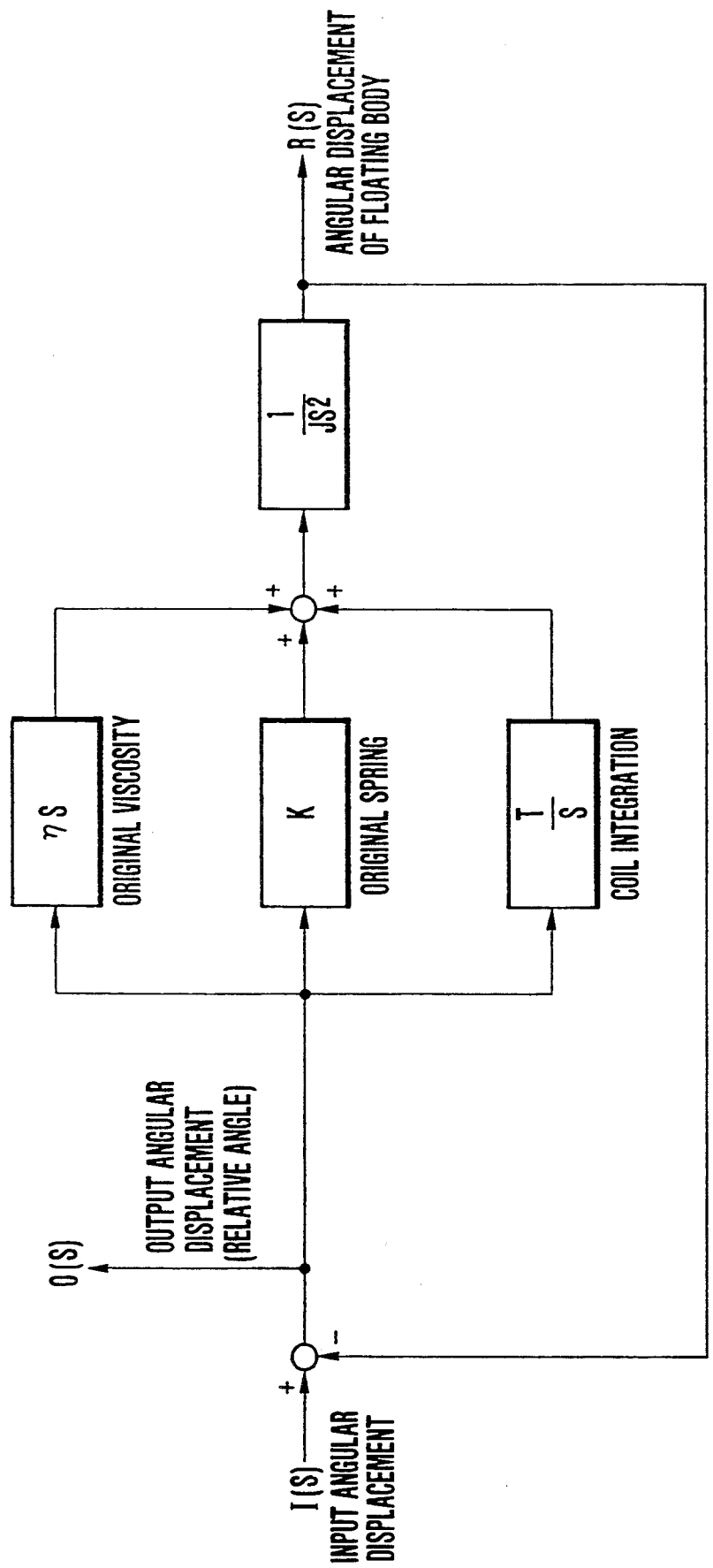
FIG. 32 is a schematic block diagram which serves to illustrate the circuit characteristics of the electrical construction of FIG. 31.

The characteristics of the angular displacement detecting device according to the fourteenth embodiment will now be described with reference to the frequency transfer characteristic shown in FIG. 32.

An input I(S) indicates the displacement of the tubular casing 2 with respect to absolute space. An output angular displacement O(S), which is detected by the device according to the fourteenth embodiment, is detected on the basis of the relative relationship between the input angular displacement I(S) and the displacement R(S) of the floating body 3 with respect to the absolute space. Therefore, the output angular displacement O(S) is represented by the following equation:

$$O(S) = I(S) - R(S) \tag{26}$$

The output angular displacement O(S) is the relative angular displacement between the tubular casing 2 and the floating body 3, and a viscosity force $\eta SO(S)$ which is proportional to the relative velocity between the tubular casing 2 and the floating body 3 is produced owing to the viscosity of the liquid 4 sealed in the tubular casing 2. In theory, if the width of the yoke 6 is infinitely large with respect to the direction of movement of the floating body 3, no force based on magnetic force occurs while the wound coil 7 is not being energized. However, in practice, since the width of the yoke 6 is finite, a spring force KO(S) also works as a weak force. Further, in the fourteenth embodiment, it is possible to apply a new integral force by generating a force by supplying the wound coil 7 with an electric current proportional to the integral value of the relative displacement between the tubular casing 2 and the floating body 3 by means of the above-described method. In the fourteenth embodiment, an integral force (T/S)O(S), which is derived from the energization of the coil, acts in the same direction as the original spring force KO(S), and an arbitrary magnitude of integral force can be produced on the basis of the value of the gain setting resistor 172.

On the assumption that the above-described forces work on the floating body 3, if the moment of inertia J of the liquid 4 sealed in the tubular casing 3 is used to express the angular displacement R(S) of the floating body 3 with respect to absolute space, the following equation is obtained:

$$R(S) = \frac{1}{JS^2} \cdot (K + \eta S + T/S)O(S) \qquad (27)$$

If the transfer characteristic of the fourteenth embodiment is expressed by using Equations (26) and (27), the following equation is obtained:

$$\frac{O(S)}{I(S)} = \frac{JS^3}{JS^3 + \eta S^2 + KS + T} \qquad (28)$$

Equation (28) represents the characteristic of a high-pass filter of third order, and it is apparent that its frequency characteristic is determined by the integral force produced by the would coil 7.

Figure 33:
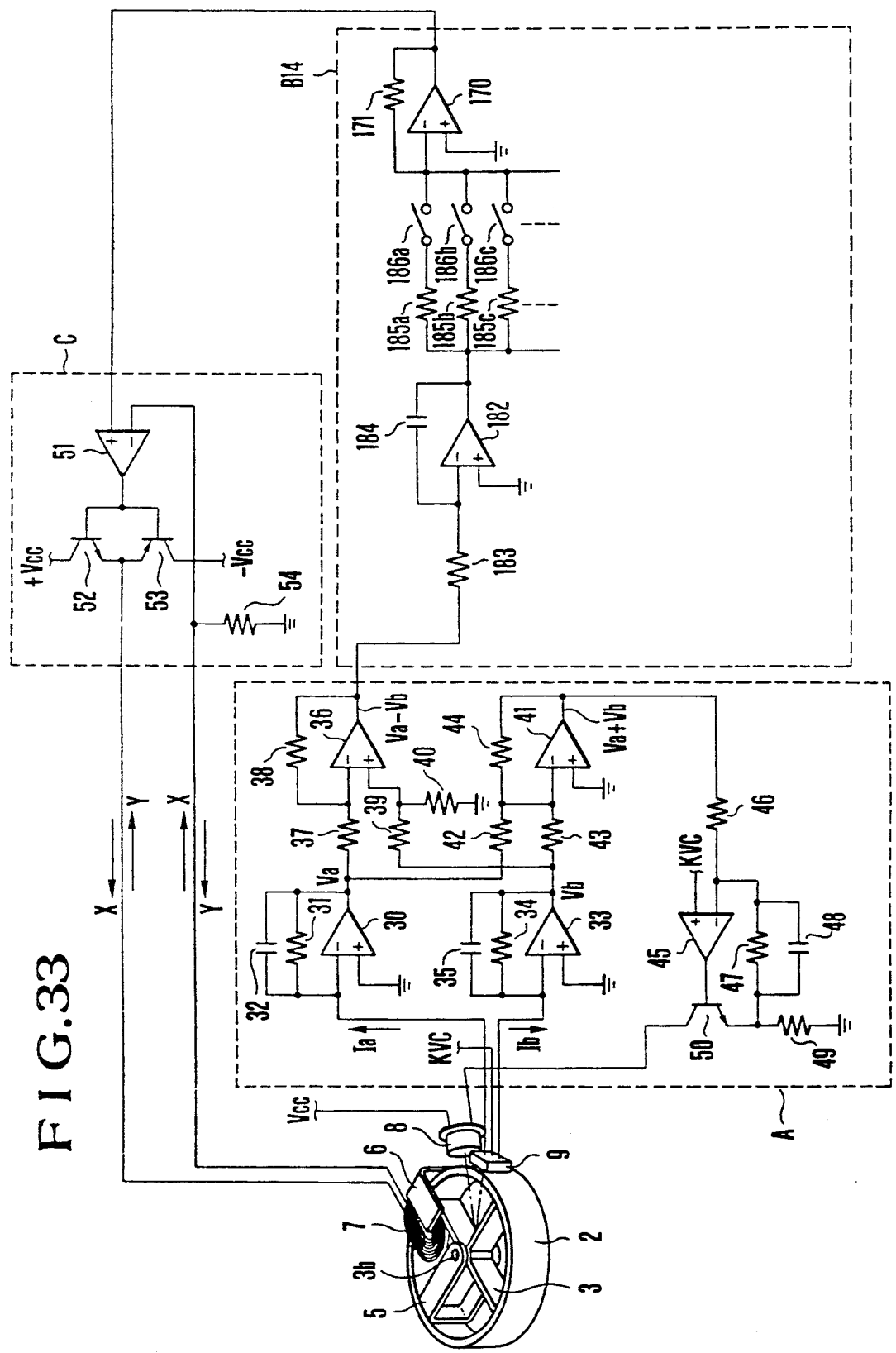
FIG. 33 is a circuit diagram showing a fifteenth embodiment of the electrical construction of the angular displacement detecting device according to the present invention.

FIG. 33 shows a fifteenth embodiment of the electrical construction of an angular displacement detecting device according to the present invention, and this electrical construction includes a plurality of integration constant setting means.

In such electrical construction, the position detecting circuit block A and the driver circuit block C are substantially identical to the corresponding blocks shown in FIG. 5. In FIG. 33, like reference numerals are used to denote elements which are similar to those shown in FIGS. 5 and 31, and a description thereof is omitted.

In FIG. 33, a block B14 represents an integration constant setting and switching circuit for setting and switching a plurality of integration constants in the fifteenth embodiment. A relative position signal (Va−Vb) indicative of the relative position between the tubular casing 2 and the floating body 3 passes through an integrating circuit formed by an operational amplifier 182, a resistor 183 and a capacitor 184, and is then applied to the inverting input terminal of the operational amplifier 170 through a plurality of gain setting resistors 185a, 185b, 185c, . . . and a plurality of gain selecting switches 186a, 186b, 186c, . . . Since the feedback resistor 171 is connected to the operational amplifier 170, a gain is set by a selective combination of the gain setting resistors 185a, 185b, 185c, . . . in accordance with the ON/OFF state of each of the gain selecting switches 186a, 186b, 186c, . . .

Since the output of the operational amplifier 170 is provided to an input of the driver circuit block C, the wound coil 7 is supplied with a coil current which is proportional to the integral value of the relative displacement between the tubular casing 2 and the floating body 3 and whose proportionality factor can be set and switched by the block B14, whereby an integral force works on the floating body 3 as described above.

The integral force set by the gain setting resistors 185a, 185b, 185c, . . . works in apparently the same direction as the original spring force KO(S), and as the number of gain selecting switches 186a, 186b, 186c, . . . to be switched on increases, a corresponding apparent integral force increases. In the fifteenth embodiment, it is possible to freely control the value of the integral force by selectively switching on and off the switches and causing the integral force to work in the same direction as the original spring force.

Figure 34:
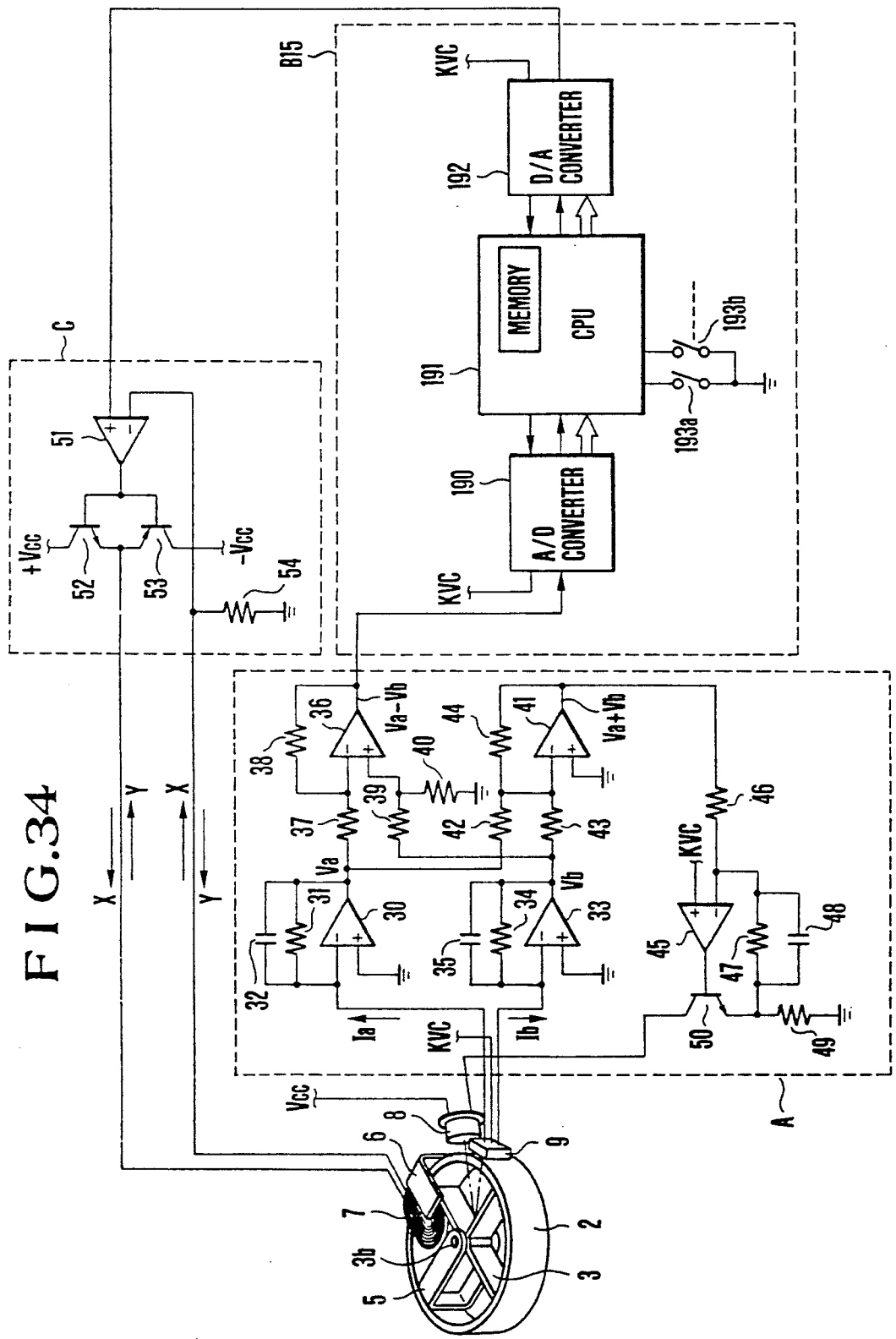
FIG. 34 is a circuit diagram showing a sixteenth embodiment of the electrical construction of the angular displacement detecting device according to the present invention.
Figure 35:
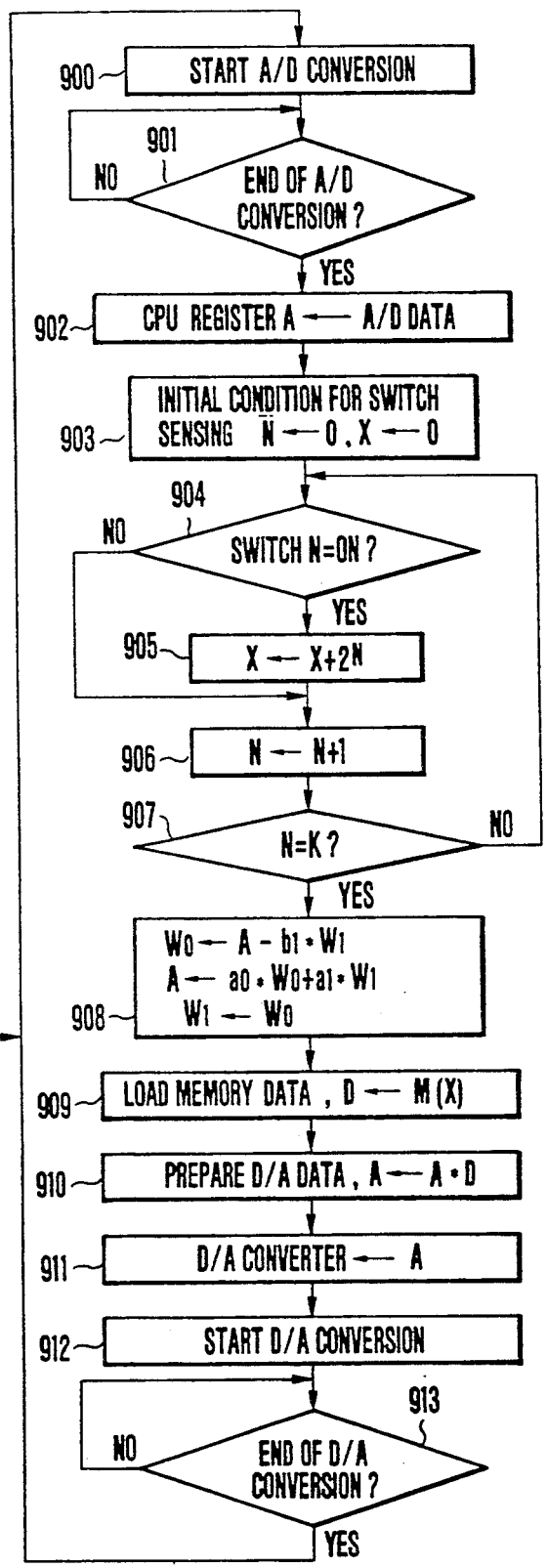
FIG. 35 is a flow chart showing the operations of the essential portions shown in FIG. 34.

FIG. 34 is a block diagram showing a sixteenth embodiment of the electrical construction of an angular displacement detecting device according to the present invention, in which a plurality of integration constants are digitally set. FIG. 35 shows a flow chart of the operation of the sixteenth embodiment. In such electrical construction, the position detecting circuit block A and the driver circuit block C are substantially identical to the corresponding blocks shown in FIG. 5. In FIG. 34, like reference numerals are used to denote elements which are similar to those shown in FIG. 5, and a description thereof is omitted.

In FIG. 34, a block B15 represents a control circuit for providing digital control in this embodiment. The block B15 comprises an A/D converter 190 for converting analog data into digital data, a CPU 191 for performing global arithmetic operations as well as state detection and a D/A converter 192 for outputting analog data on the basis of data supplied from the CPU 191. Parameter setting switches 193a, 193b, . . . are connected to the CPU 191.

The operation of the sixteenth embodiment will be described below with reference to the flow chart shown in FIG. 35.

In Step 898, constants for constituting a filter utilizing digital arithmetic operations are set. Here, the frequency characteristic H(S) of the integrating circuit shown in FIG. 31 is expressed as:

$$H(S) = \frac{1}{SCR} \qquad (29)$$

where C is the capacity of the capacitor 175 and R is the value of the resistor 174.

If this characteristic is subject to known S-Z conversion $(S \to 2/T \cdot (1-Z^{-1})/(1+Z^{-1})$: T is the sampling time of A/D conversion), the result is expressed in terms of a Z plane by the following difference equations:

$$H(Z) = \frac{a_0 + a_1 Z^{-1}}{1 + b_1 Z^{-1}} \qquad (30)$$

$$a_0 = \frac{T}{2CR} \qquad (31)$$

$$a_1 = \frac{T}{2CR} \qquad (32)$$

$$b_1 = -1 \qquad (33)$$

If the equation (30) is developed into equations for numerical operations, the following equations are obtained:

$$W0 = e0 - b1W1 \qquad (34)$$

$$u0 = a0W0 + a1W1 \qquad (35)$$

where e0 represents the input signal obtained by the present A/D conversion, We represents the result obtained from Equation (34) on the basis of the present input signal, W1 represents the value of the last W0 (the last operation of A/D conversion), and u0 represents the present output signal obtained from Equation (35).

Accordingly, in Step 898, as expressed by Equations (31), (32) and (33), the numerical values required to perform integration control utilizing numerical operations are substituted into the memories a0, a1 and b1. In Step 899, the value of the memory W1 appearing in Equation (34) is reset to zero as an initial value.

In Step 900, the A/D converter 190 initiates A/D conversion of the relative position signal (Va−Vb) indicative of the relative position between the tubular casing 2 and the floating body 3 in response to an A/D control signal from the CPU 191. In Step 901, it is determined whether the A/D conversion has been completed. If the A/D conversion has been completed, the process proceeds to Step 902, where the result of the A/D conversion is transferred from the A/D converter 190 to a register A in the CPU 191. In Step 903, an initial condition for switch sensing is set so that a counter N and the value of a register X are each reset to zero.

In Step 904, it is determined whether the state of a switch N (N=0: 193a, N=1: 193b, ...) is ON. If it is ON, the process proceeds to Step 905, where $2^N$ is added to the value of the register X. If it is OFF, the addition is omitted and the process jumps to Step 906. In Step 906, the value of the counter N is incremented by one and then, in Step 907, it is determined whether the value of the counter N has reached "K". If "K" has not yet been reached, the process returns to Step 904, where the state detection of the switch is again performed. If "K" has been reached, the state detection of the switch is completed.

Figure 36:
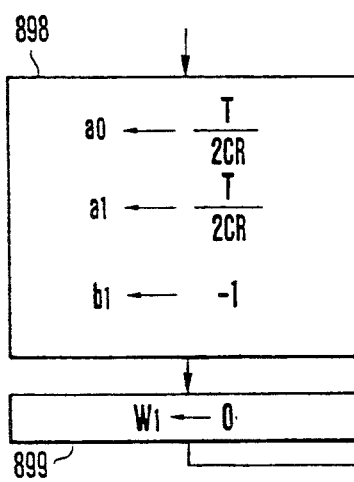
FIG. 36 is a view showing a memory data table used in the embodiment of FIG. 34.
Figure 37:
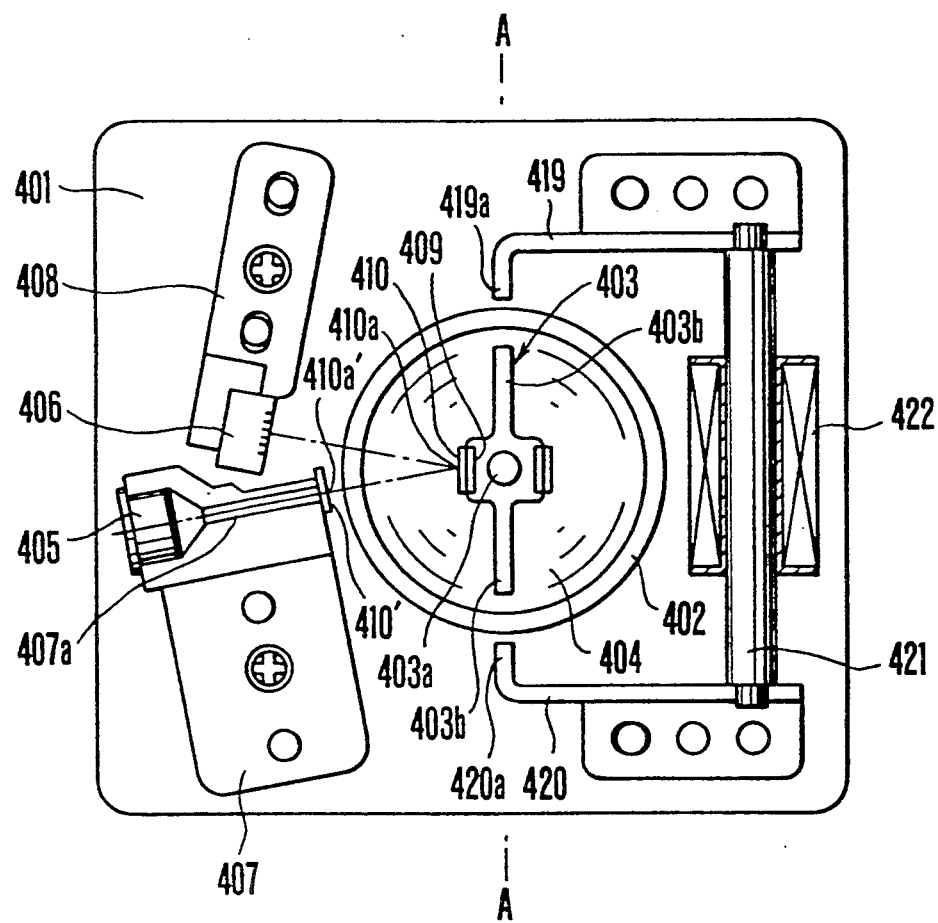
FIG. 37 is a schematic plan view showing the mechanical construction of a conventional angular displacement detecting device.
Figure 38:
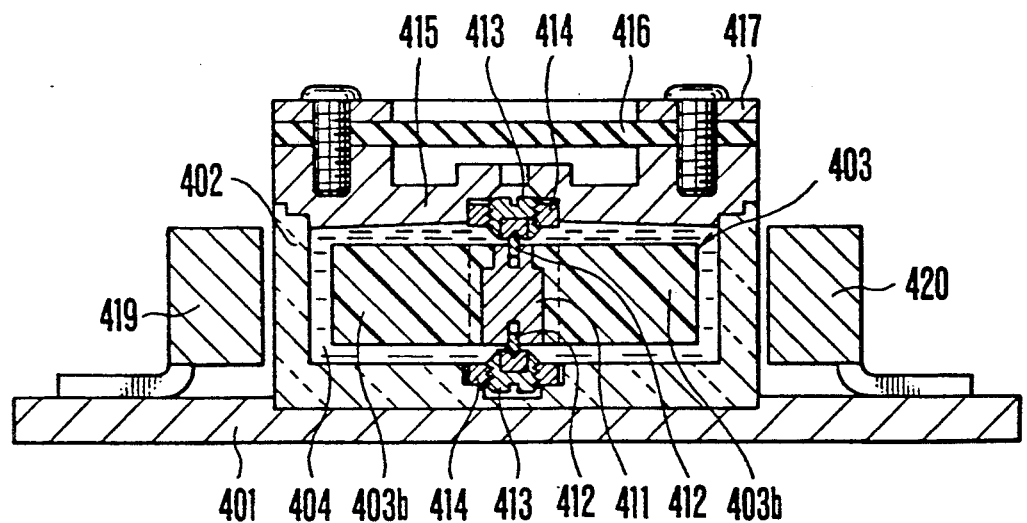
FIG. 38 is a cross-sectional view taken along line A—A of FIG. 37.
Figure 39:
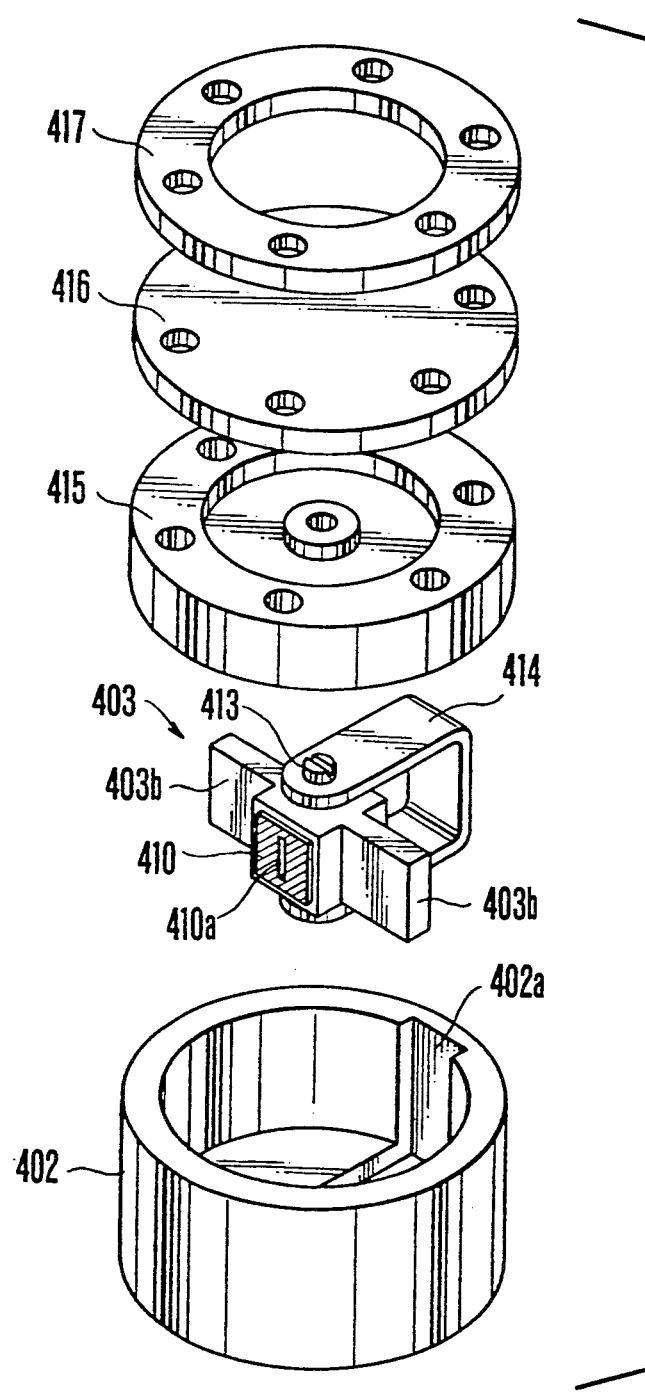
FIG. 39 is a schematic perspective view showing in exploded form the construction of the essential portions of FIG. 37.

In Steps 904 to 907, $2^K$ combinations are determined on the basis of the states of K switches. Accordingly, if corresponding data are stored on a memory table as shown in FIG. 36, it is possible to freely select a parameter according to the states of the switches.

In Step 908, operations on Equations (34) and (35) are performed. The value obtained by multiplying the value of the memory b1 by the value of the memory W1 is subtracted from the value of a register A in which the value obtained from the A/D conversion of the relative position signal (Va −Vb) is stored, and the result is stored in the memory W0. Then, the value obtained by multiplying the value of the memory a0 by the value of the memory W0 is added to the value obtained by multiplying the value of the memory a1 by the value of the memory W1, and the result is set in the register A. The value of the memory W0 is stored in the memory W1.

Since the numerical value corresponding to the state of the switch is substituted in the register X as described above, data M(X) having an address corresponding to such numerical value is, in Step 909, set in a register D in the CPU 161. In Step 910, the value of the register A is multiplied by the value of the register D and the result is set in the register A. In Step 911, the value of the register A is transferred to the D/A converter 192. In Step 912, D/A conversion is initiated and, in Step 913, it is determined whether the D/A conversion has been completed. If the D/A conversion is completed, the process returns to Step 900.

Since the output of the D/A converter 192 is connected to an input port of the driver circuit block C, an electrical current proportional to the output of the D/A converter 192 is supplied to the wound coil 7. Accordingly, in the sixteenth embodiment, it is possible to vary a proportionality factor, i.e., an integral force, on the basis of the states of the parameter setting switches 193a, 193b, ...

In accordance with each of the above-described embodiments, the wound coil disposed in a closed magnetic path is energized to generate an electromagnetic force so that a floating body can be freely driven to an arbitrary position. Accordingly, it is possible to freely change the characteristics of the device with small electrical energy, whereby the start-up characteristics and frequency characteristics of the device as well as the stability thereof with respect to environments can be improved. It is also possible to electrically adjust the offset of the floating body from a reference position.

Although each of the above-described embodiments refers to an angular displacement detecting device, the present invention can, of course, be applied to devices of various kinds for performing detection of relative movement, such as displacement detection, velocity detection, angular-velocity detection, acceleration detection and angular-acceleration detection.

Although in each of the above-described embodiments the floating body is disposed in a liquid, the present invention can, of course, be applied to an arrangement in which a movable body, which is relatively movable with respect to a supporting means, is not disposed in a liquid.

What is claimed is:

1. An angular displacement detecting device including a tubular casing having a chamber in which a liquid is sealed, a floating body disposed in said liquid and supported for rotation about a predetermined rotational axis, and detecting means for detecting the relative angular displacement between said floating body and said tubular casing about said rotational axis, said angular displacement detecting device, comprising:

(A) closed-magnetic-path forming means for forming a closed magnetic path including said floating body;

(B) an electrical conductor disposed in said closed magnetic path for relatively displacing said floating body with respect to said tubular casing by energization; and (C) a controlling circuit for varying the amount of energization at the time of the energization of the electrical conductor.

2. An angular displacement detecting device according to claim 1, wherein said electrical conductor includes a coil.

3. An angular displacement detecting device according to claim 1, wherein said electrical conductor is disposed in fixed relation to said tubular casing.

4. An angular displacement detecting device according to claim 1, wherein said closed-magnetic-path forming means includes a yoke and means for making said floating body a permanent magnet.

5. An angular displacement detecting device according to claim 1, wherein said closed-magnetic-path forming means includes a yoke and a permanent magnet disposed on said yoke.

6. An angular displacement detecting device according to claim 5, wherein said closed-magnetic-path forming means includes means for making said floating body a magnetic body.

7. An angular displacement detecting device according to claim 1, wherein said closed-magnetic-path forming means includes a yoke and an electromagnet disposed on said yoke.

8. An angular displacement detecting device according to claim 7, wherein said closed-magnetic-path forming means includes means for making said floating body a magnetic body.

9. An angular displacement detecting device according to claim 1, wherein said controlling means includes proportioning means for varying the amount of energization of said electrical conductor in proportion to the relative displacement of said floating body with respect to said tubular casing.

10. An angular displacement detecting device according to claim 9, wherein said proportioning means includes means for varying a proportionality factor.

11. An angular displacement detecting device according to claim 1, wherein said controlling means includes proportioning means for varying the amount of energization of said electrical conductor in proportion to a differential value of the relative displacement of said floating body with respect to said tubular casing.

12. An angular displacement detecting device according to claim 11, wherein said proportioning means includes means for varying a proportionality factor.

13. An angular displacement detecting device according to claim 11, wherein said proportioning means includes means for varying a proportionality factor in accordance with temperature.

14. An angular displacement detecting device according to claim 11, wherein said proportioning means includes means for increasing the value of said proportionality factor in response to an increase in temperature.

15. An angular displacement detecting device according to claim 11, wherein said proportioning means includes means for logarithmically varying said proportionality factor in accordance with temperature.

16. An angular displacement detecting device according to claim 1, wherein said controlling means includes proportioning means for varying the amount of energization of said electrical conductor in proportion to a second-order differential value of the relative displacement of said floating body with respect to said tubular casing.

17. An angular displacement detecting device according to claim 16, wherein said proportioning means includes means for varying a proportionality factor.

18. An angular displacement detecting device according to claim 1, wherein said controlling means includes proportioning means for varying the amount of energization of said electrical conductor in proportion to an integral value of the relative displacement of said floating body with respect to said tubular casing.

19. An angular displacement detecting device according to claim 18, wherein said proportioning means includes means for varying a proportionality factor.

20. An angular displacement detecting device according to claim 9, wherein said controlling means includes means for effecting a predetermined amount of energization independent of the relative displacement of said floating body with respect to said tubular casing.

21. An angular displacement detecting device according to claim 20, wherein said controlling means includes means for varying said predetermined amount of energization.

22. A relative movement detecting device including a tubular casing having a chamber in which a liquid is sealed, a floating body moveably supported in said liquid sealed in said tubular casing, and detecting means for detecting the relative movement between said floating body and said tubular casing, said relative movement detecting device, comprising:

(A) closed-magnetic-path forming means for forming a closed magnetic path including said floating body;

(B) an electrical conductor disposed in said closed magnetic path for relatively moving said floating body with respect to said tubular casing by energization; and (C) controlling means for varying the amount of energization at the time of the energization of the electrical conductor.

23. A relative movement detecting device according to claim 22, wherein said electrical conductor includes a coil.

24. A relative movement detecting device according to claim 22, wherein said electrical conductor is disposed in fixed relation to said tubular casing.

25. A relative movement detecting device according to claim 22, wherein said closed-magnetic-path forming means includes a yoke and means for making said floating body a permanent magnet.

26. A relative movement detecting device according to claim 22, wherein said closed-magnetic-path forming means includes a yoke and a permanent magnet disposed on said yoke.

27. A relative movement detecting device according to claim 26, wherein said closed-magnetic-path forming means includes means for making said floating body a magnetic body.

28. A relative movement detecting device according to claim 22, wherein said closed-magnetic-path forming means includes a yoke and an electromagnet disposed on said yoke.

29. A relative movement detecting device according to claim 28, wherein said closed-magnetic-path forming means includes means for making said floating body a magnetic body.

30. A relative movement detecting device according to claim 22, wherein said controlling means includes proportioning means for varying the amount of energization of said electrical conductor in proportion to the relative movement of said floating body with respect to said tubular casing.

31. A relative movement detecting device according to claim 30, wherein said proportioning means includes means for varying a proportionality factor.

32. A relative movement detecting device according to claim 22, wherein said controlling means includes proportioning means for varying the amount of energization of said electrical conductor in proportion to a differential value of the relative movement of said floating body with respect to said tubular casing.

33. A relative movement detecting device according to claim 32, wherein said proportioning means includes means for varying a proportionality factor.

34. A relative movement detecting device according to claim 32, wherein said proportioning means includes means for varying a proportionality factor in accordance with temperature.

35. A relative movement detecting device according to claim 32, wherein said proportioning means includes means for increasing the value of said proportionality factor in response to an increase in temperature.

36. A relative movement detecting device according to claim 32, wherein said proportioning means includes means for logarithmically varying said proportionality factor in accordance with temperature.

37. A relative movement detecting device according to claim 22, wherein said controlling means includes proportioning means for varying the amount of energization of said electrical conductor in proportion to a second-order differential value of the relative movement of said floating body with respect to said tubular casing.

38. A relative movement detecting device according to claim 37, wherein said proportioning means includes means for varying a proportionality factor.

39. A relative movement detecting device according to claim 22, wherein said controlling means includes proportioning means for varying the amount of energization of said electrical conductor in proportion to an integral value of the relative movement of said floating body with respect to said tubular casing.

40. A relative movement detecting device according to claim 39, wherein said proportioning means includes means for varying a proportionality factor.

41. A relative movement detecting device according to claim 30, wherein said controlling means includes means for effecting a predetermined amount of energization independent of the relative movement of said floating body with respect to said tubular casing.

42. A relative movement detecting device according to claim 41, wherein said controlling means includes means for varying said predetermined amount of energization.

43. A relative movement detecting device according to claim 22, wherein said controlling means includes means for effecting a predetermined amount of energization independent of the relative movement of said floating body with respect to said tubular casing.

44. A relative movement detecting device according to claim 43, wherein said controlling means includes means for varying said predetermined amount of energization.

45. An angular displacement detecting device according to claim 1, wherein said controlling means includes means for effecting a predetermined amount of energization independent of the relative displacement of said floating body with respect to said tubular casing.

46. An angular displacement detecting device according to claim 45, wherein said controlling means includes means for varying said predetermined amount of energization.

47. A relative displacement detecting device comprising:
(A) a movable body;
(B) supporting means for supporting said movable body for rotation about a predetermined rotational axis;
(C) detecting means for detecting the relative angular displacement between said movable body and said supporting means about said rotational axis;
(D) closed-magnetic-path forming means for forming a closed magnetic path including said movable body;
(E) an electrical conductor disposed in said closed magnetic path for relatively displacing said floating body with respect to said tubular casing by energization; and
(F) controlling means for varying the amount of energization at the time of the energization of said electrical conductor.

48. A relative movement detecting device comprising:
(A) a movable body;
(B) supporting means for movably supporting said movable body;
(C) detecting means for detecting the relative movement between said movable body and said supporting means about said rotational axis;
(D) closed-magnetic-path forming means for forming a closed magnetic path including said movable body; and
(E) an electrical conductor disposed in said closed magnetic path for relatively moving said floating body with respect to said tubular casing by energization; and
(F) controlling means for varying the amount of energization at the time of the energization of said electrical conductor.

* * * * *

UNITED STATES PATENT AND TRADEMARK OFFICE
CERTIFICATE OF CORRECTION

PATENT NO. : 5,136,158

DATED : August 4, 1992

INVENTOR(S) : Isao Nakazawa and Yasuhiko Shiomi

It is certified that error appears in the above-identified patent and that said Letters Patent is hereby corrected as shown below:

Col. 1, line 20.  Change "2-02414" to -- 2-102414 --

Col. 2, line 1.   After "attitude" insert -- . --

Col. 9, line 1.   Change "a" to -- an -- (both occurrences)

Col. 13, line 56. Change "64c," to -- KO(S), as the number of gain selecting switches 64a, 64b, 64c --

Col. 14, line 8.  Change "represent" to -- represents --

Col. 14, line 21. Change "initiated" to -- initiates --

Col. 14, line 29. Change "form" to -- from --

Col. 14, line 47. Change "n" to -- on --

Col. 14, line 55. Change "501" to -- 510 --

Col. 16, line 36. Change "would" to -- wound --

Col. 16, line 55. Change "983" to -- 93 --

Col. 16, line 61. Change "95f" to -- 95 --

Col. 18, line 22. Change "We" to -- Wo --

UNITED STATES PATENT AND TRADEMARK OFFICE
CERTIFICATE OF CORRECTION

PATENT NO.    : 5,136,158
DATED         : August 4, 1992
INVENTOR(S)   : Isao Nakazawa and Yasuhiko Shiomi It is certified that error appears in the above-indentified patent and that said Letters Patent is hereby corrected as shown below:

```
Col. 23, line 12.   After "147," insert -- and is then applied
                    to the inverting input terminal of the --
Col. 24, line 51.   Change "We" to -- Wo --
Col. 27, line 24.   Change "would" to -- wound --
Col. 28, line 64.   Change "We" to -- Wo --
```

Signed and Sealed this

Twenty-sixth Day of October, 1993

Attest:

BRUCE LEHMAN

Attesting Officer     Commissioner of Patents and Trademarks